US012010761B2

(12) United States Patent
Yang et al.

(10) Patent No.: US 12,010,761 B2
(45) Date of Patent: Jun. 11, 2024

(54) TECHNIQUES TO FACILITATE V2X IDENTIFIER-BASED TRANSPORT TYPES OF A GEOGRAPHICAL NETWORK LAYER PROTOCOL

(71) Applicant: QUALCOMM Incorporated, San Diego, CA (US)

(72) Inventors: Seung Ryul Yang, San Diego, CA (US); Vincent Douglas Park, Alexandria, VA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/359,106

(22) Filed: Jun. 25, 2021

(65) Prior Publication Data
US 2022/0418037 A1 Dec. 29, 2022

(51) Int. Cl.
*H04W 80/04* (2009.01)
*H04W 4/02* (2018.01)
(Continued)

(52) U.S. Cl.
CPC .......... *H04W 80/04* (2013.01); *H04W 4/025* (2013.01); *H04W 4/06* (2013.01); *H04W 8/26* (2013.01); *H04W 40/20* (2013.01)

(58) Field of Classification Search
CPC ....... H04W 80/04; H04W 4/025; H04W 4/06; H04W 8/26; H04W 40/20
See application file for complete search history.

(56) References Cited

U.S. PATENT DOCUMENTS 6,366,771 B1 * 4/2002 Angle .................. H04W 88/16
455/414.1
2019/0268447 A1 8/2019 Yang et al.
(Continued)

FOREIGN PATENT DOCUMENTS

| WO | WO-2017171923 A1 * | 10/2017 | ............ H04W 4/021 |
| WO | WO-2019017506 A1 * | 1/2019 | ........... H04L 1/1883 |
| WO | 2019139194 A1 | 7/2019 | |

OTHER PUBLICATIONS

ETSI TS 102 636-4-1 V1.1.1 (Jun. 2011); Intelligent Transport Systems (ITS); Vehicular Communications; Geonetworking (Year: 2011).*
(Continued)

*Primary Examiner* — Marisol Figueroa
(74) *Attorney, Agent, or Firm* — Procopio, Cory, Hargreaves & Savitch LLP QUALCOMM Incorporated

(57) ABSTRACT

Apparatus, methods, and computer-readable media for facilitating identifier-based transport types of a GNLP are disclosed herein. An example method for wireless communication at a transmitting UE includes receiving a message based on a GNLP, the message including a GNLP header. The example method also includes populating the GNLP header to indicate that the message is associated with a single-hop transport type, the single-hop transport type including a unicast message, a groupcast message, or a broadcast message. The example method also includes transmitting the message via sidelink to a receiving UE. An example method for wireless communication at a receiving UE includes receiving, from a transmitting UE, a message via sidelink, the message based on a GNLP and including a GNLP header. The example method also includes using the GNLP header to determine that the message is associated with a single-hop transport type.

34 Claims, 16 Drawing Sheets

(51) Int. Cl.
    *H04W 4/06*     (2009.01)
    *H04W 8/26*     (2009.01)
    *H04W 40/20*     (2009.01)

(56) References Cited

U.S. PATENT DOCUMENTS

| | | | |
|---|---|---|---|
| 2020/0336870 A1 | 10/2020 | Back et al. | |
| 2021/0153062 A1* | 5/2021 | Zhang | H04W 4/70 |
| 2021/0314843 A1* | 10/2021 | Yang | H04W 4/40 |

OTHER PUBLICATIONS

English Translation for WO-2019017506-A1 (Year: 2019).*
International Search Report and Written Opinion—PCT/US2022/027509—ISA/EPO—Aug. 11, 2022.

* cited by examiner

FIG. 6A

| Basic 602 | Common 604 | Extended 606 |
|---|---|---|

| NH | Reserved | HT | HST | TC | Flags |
|---|---|---|---|---|---|
| | | PL | | MHL | Reserved |

| Header Type (HT) 622 | Header Sub-Type (HST) 624 | Encoding | Description |
|---|---|---|---|
| Any | Unspecified | 0 | Unspecified |
| Beacon | Unspecified | 0 | Beacon |
| Geo-Unicast | Unspecified | 0 | GeoUnicast |
| | Unspecified | 0 | Unspecified |
| Geo-Anycast | | 3 | Geographically-Scoped Anycast (GAC) |
| | GeoAnycast_Circle | 0 | Circular area |
| | GeoAnycast_Rect | 1 | Rectangular area |
| | GeoAnycast_Elip | 2 | Ellipsoidal area |
| Geo-Broadcast | | 4 | Geographically-Scoped Broadcast (GBC) |
| | GeoBroadcast_Circle | 0 | Circular area |
| | GeoBroadcast_Rect | 1 | Rectangular area |
| | GeoBroadcast_Elip | 2 | Ellipsoidal area |
| TSB | | 5 | Topologically-Scoped Broadcast (TSB) |
| | Single Hop | 0 | Single-hop broadcast (SHB) |
| | Multi Hop | 1 | Multi-hop TSB |
| LS | | 6 | Location service (LS) |
| | LS Request | 0 | Location service request |
| | LS Reply | 1 | Location service reply |

620

FIG. 8A
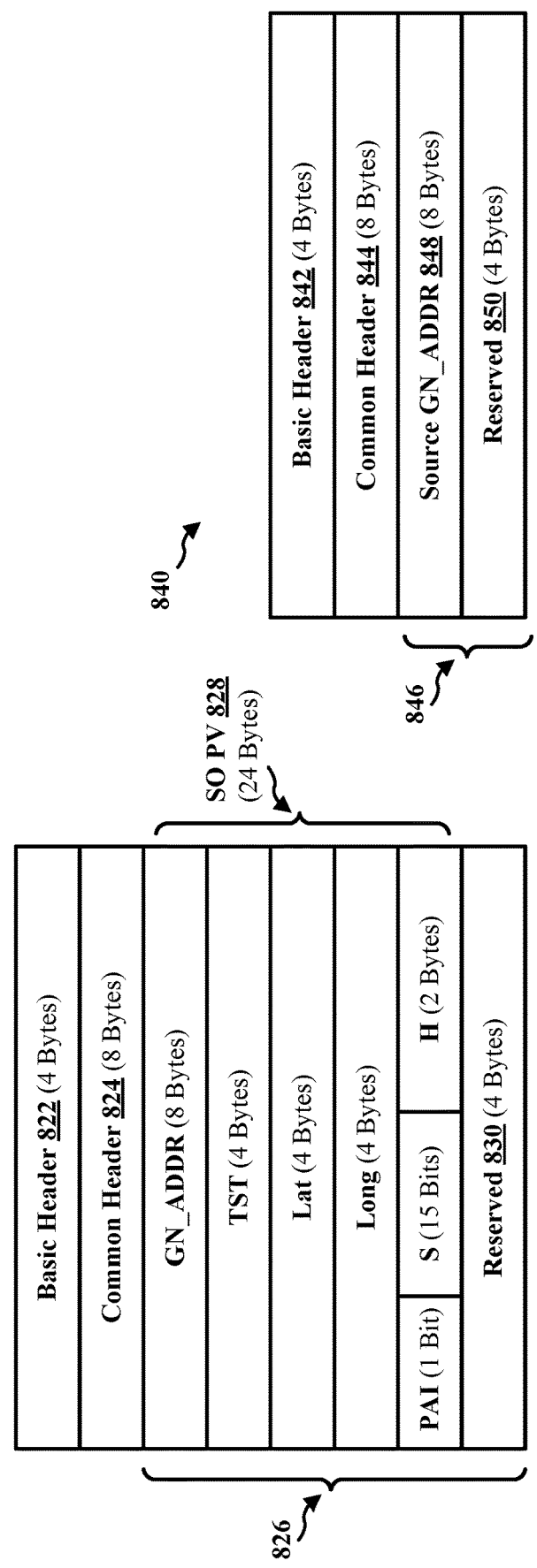
FIG. 8B
FIG. 8C

TECHNIQUES TO FACILITATE V2X IDENTIFIER-BASED TRANSPORT TYPES OF A GEOGRAPHICAL NETWORK LAYER PROTOCOL

TECHNICAL FIELD

The present disclosure relates generally to communication systems, and more particularly, to wireless communication using sidelink

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink, such as in vehicle-to-everything (V2X) and/or other device-to-device (D2D) communication. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a transmitting user equipment (UE). An example apparatus may receive a message based on a geographical network layer protocol (GNLP), the message including a GNLP header. The example apparatus may populate the GNLP header to indicate that the message is associated with a single-hop transport type, the single-hop transport type including a unicast message, a groupcast message, or a broadcast message. Additionally, the example apparatus may transmit the message via sidelink to a receiving UE.

In another aspect of the disclosure, a method, a computer-readable medium, and an apparatus are provided for wireless communication at a second communication device. An example may receive, from a transmitting UE, a message via sidelink, the message based on a GNLP and including a GNLP header. The example apparatus may also use the GNLP header to determine that the message is associated with a single-hop transport type, the single-hop transport type including a unicast message, a groupcast message, or a broadcast message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6A illustrates an example GNLP header of a GNLP message, in accordance with various aspects of the present disclosure.

FIG. 6B illustrates example fields that may be included in a common header of a GNLP message, in accordance with various aspects of the present disclosure.

FIG. 6C illustrates a table illustrating different transport types that may be encoded via a header type field and a header sub-type field in a common header of a GNLP message, in accordance with various aspects of the present disclosure.

FIG. 8A illustrates an example encoding table for a unicast transmission, in accordance with various aspects of the present disclosure.

FIG. 8B illustrates an example header structure of a single-hop topologically-scoped unicast GNLP message, in accordance with various aspects of the present disclosure.

FIG. 8C illustrates another example header structure of a single-hop topologically-scoped unicast GNLP message, in accordance with various aspects of the present disclosure.

DETAILED DESCRIPTION

Figure 1:
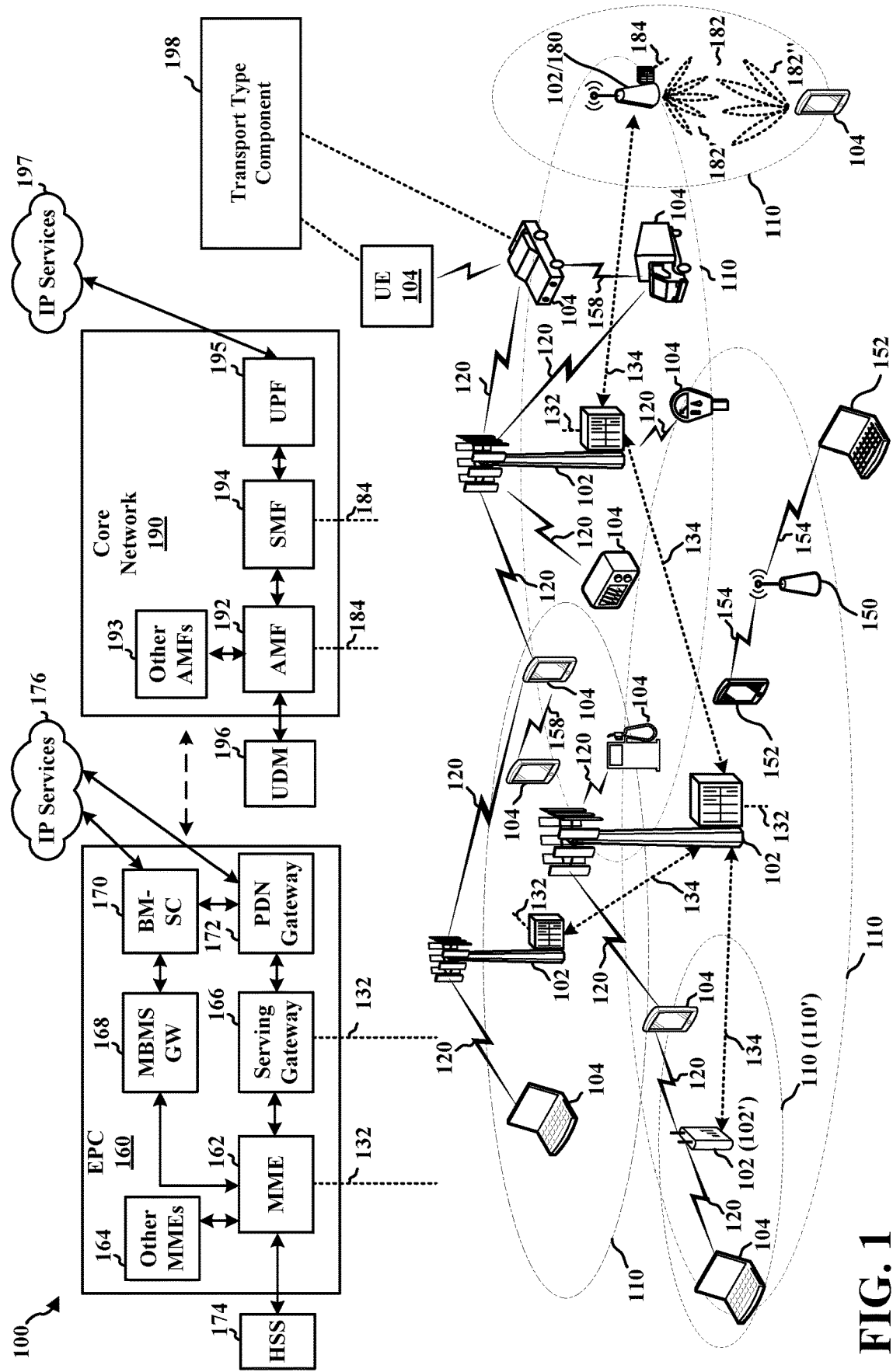
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

A link between a UE and a base station may be established as an access link, for example, using a Uu interface. Other communication may be exchanged between wireless devices based on sidelink. For example, some UEs may communicate with each other directly using a device-to-device (D2D) communication link, such as sidelink. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc.

In some examples, a sidelink communication may include different addressing information. For example, a sidelink communication may be identifier-based in which access layer functionality is used to indicate and/or identify the recipient of a message. In some examples, the access layer functionality may include a link layer address (e.g., a MAC address) associated with a destination UE. In some examples, the access layer functionality may include a range from a source UE. In some examples, the access layer functionality may include a group identifier associated with a set of one or more destination UEs. In some examples, the access layer functionality may include a UE type identifier associated with a set of one or more destination UEs. In some examples, the access layer functionality may include a link layer address (e.g., a MAC address) that may be associated with a transport type (e.g., a broadcast message). In other examples, the sidelink communication may be position-based in which geographical positioning information may be provided to indicate the recipient and/or transmitter of a message.

Aspects disclosed herein provide techniques for indicating that a GNLP message (e.g., a message based on the GNLP) is a unicast type message or a groupcast type message in addition to the geographical position-based transport types supported by the GNLP. In some examples, aspects disclose configuring the GNLP to support a topologically-scoped unicast (TSU) transport type to indicate when the GNLP message is a single-hop unicast (SHU) message or a multiple-hop unicast message. In a similar manner, the GNLP may be extended to support a topologically-scoped groupcast (TSG) transport type to indicate when the GNLP message is a single-hop groupcast (SHG) message or a multiple-hop groupcast message.

In some examples, the GNLP may be configured to include a single-hop transmission (SHT) transport type to indicate single-hop transmissions. A single-hop transmission may include a single-hop unicast message, a single-hop groupcast message, or a single-hop broadcast message. Thus, the SHT transport type may include header sub-types that indicate when the GNLP message is a unicast message, a groupcast message, or a broadcast message. In some examples, the SHT transport type may be added in addition to the geographical position-based transport types supported by the GNLP. In some examples, the SHT transport type may replace a topologically-scoped broadcast transport type supported by the GNLP.

Aspects disclosed herein provide techniques for improving the header structure of a broadcast message. For example, aspects disclosed may facilitate transmitting a single-hop broadcast message while foregoing to include position information of the source UE in the single-hop broadcast message. Accordingly, the size of the message may be reduced, which may improve communication performance by reducing resource consumption, lowering network congestion and/or bandwidth usage, and/or increasing the quantity of messages that may be transmitted.

Additionally, when a transmission is a single-hop transmission (SHT), the GNLP header (e.g., a message header or a packet header based on the GNLP) may be configured so that the header structure is the same for unicast messages, groupcast messages, and broadcast messages. For example, the GNLP header may be configured to support an SHT transport type that is cast-type independent. In some examples, the cast-type (e.g., unicast, groupcast, or broadcast) may be determined by a lower layer while processing the message. In some examples, the header sub-type of the GNLP header may be configured to indicate whether the SHT message is a unicast message, a groupcast message, or a broadcast message.

FIG. 1 is a diagram illustrating an example of a wireless communications system and an access network 100 including base stations 102 and 180 and UEs 104. In certain aspects, a transmitting device, such as a UE 104, in communication with a receiving device, may be configured to manage one or more aspects of wireless communication by facilitating sidelink communication via identifier-based transport types of a GNLP. For example, the UE 104 may include a transport type component 198 configured to indicate a single-hop transport type via a GNLP header of a message. In certain aspects, the transport type component 198 may be configured to receive a message based on a GNLP, the message including a GNLP header. The example transport type component 198 may also be configured to populate the GNLP header to indicate that the message is associated with an identifier-based transport type, the identifier-based transport type including a single-hop unicast message, a single-hop groupcast message, or a single-hop broadcast message. The example transport type component 198 may also be configured to transmit the message via sidelink to a receiving UE.

In another configuration, a receiving device, such as a UE 104, in communication with a transmitting device, may be configured to manage one or more aspects of wireless communication by facilitating sidelink communication via identifier-based transport types of a GNLP. For example, the transport type component 198 may be configured to receive, from a transmitting UE, a message via sidelink, the message based on a GNLP and including a GNLP header. The example transport type component 198 may also be configured to use the GNLP header to determine that the message is associated with a single-hop transport type, the single-hop transport type including a unicast message, a groupcast message, or a broadcast message.

The aspects presented herein may enable a first UE to communicate with a second UE using identifier-based transport types via a GNLP, which may facilitate improving communication performance, for example, by improving reliability. Aspects may additionally or alternative improve communication performance by facilitating increased data rates, increased capacity, and/or improved spectral efficiency.

Although the following description provides examples directed to 5G NR (and, in particular, to sidelink-based communication), the concepts described herein may be applicable to other similar areas, such as LTE, LTE-A, CDMA, GSM, and/or other wireless technologies, in which a UE may communicate directly with another device without routing the communication through a base station.

Additionally, while the following description provides examples directed to V2X sidelink, the concepts described herein may be applicable to other similar areas in which devices may communicate directly (e.g., without routing the communication through a base station), such as in an industrial IoT (IIoT) environment.

In some examples, a D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first device and a second device (e.g., a first UE and a second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
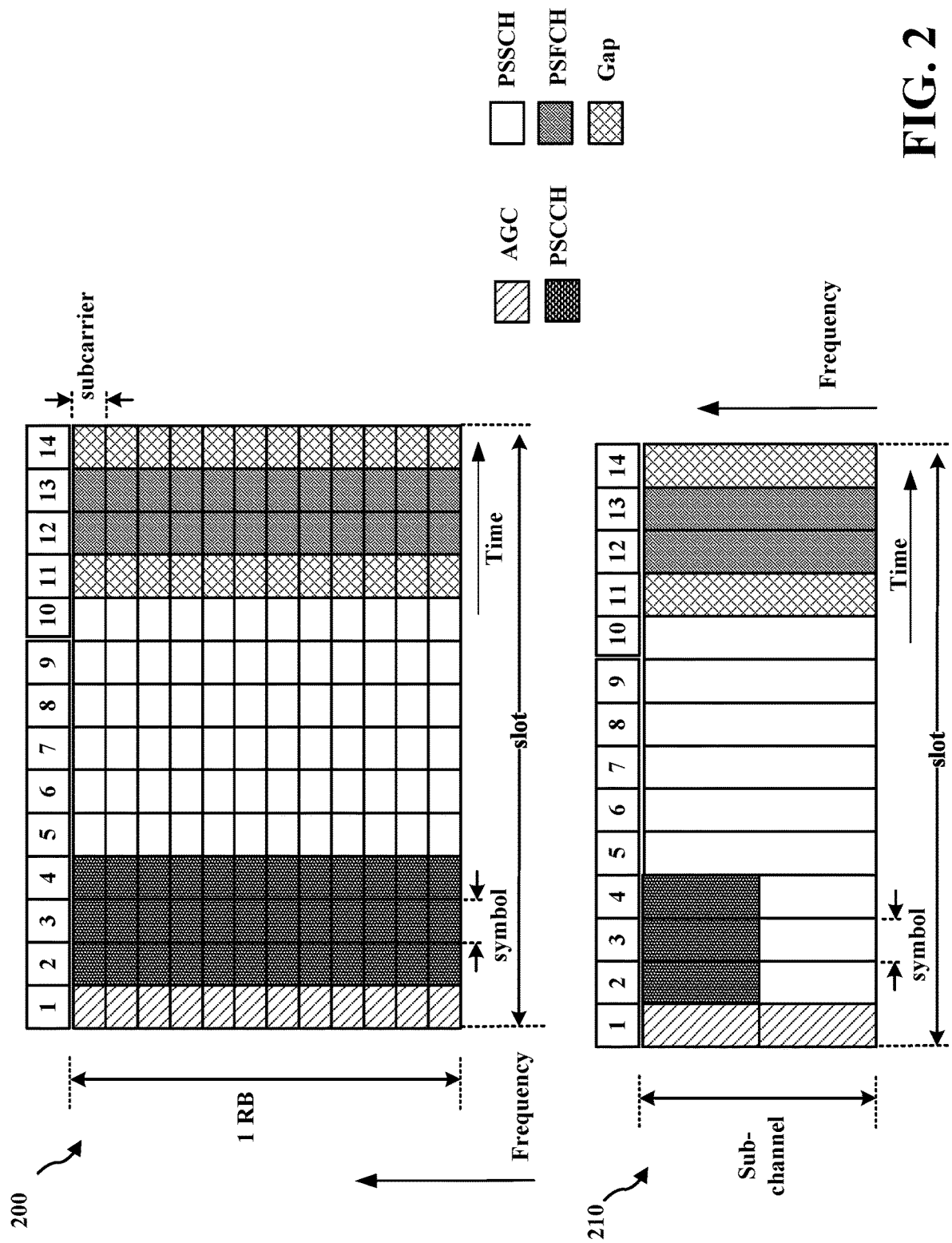
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
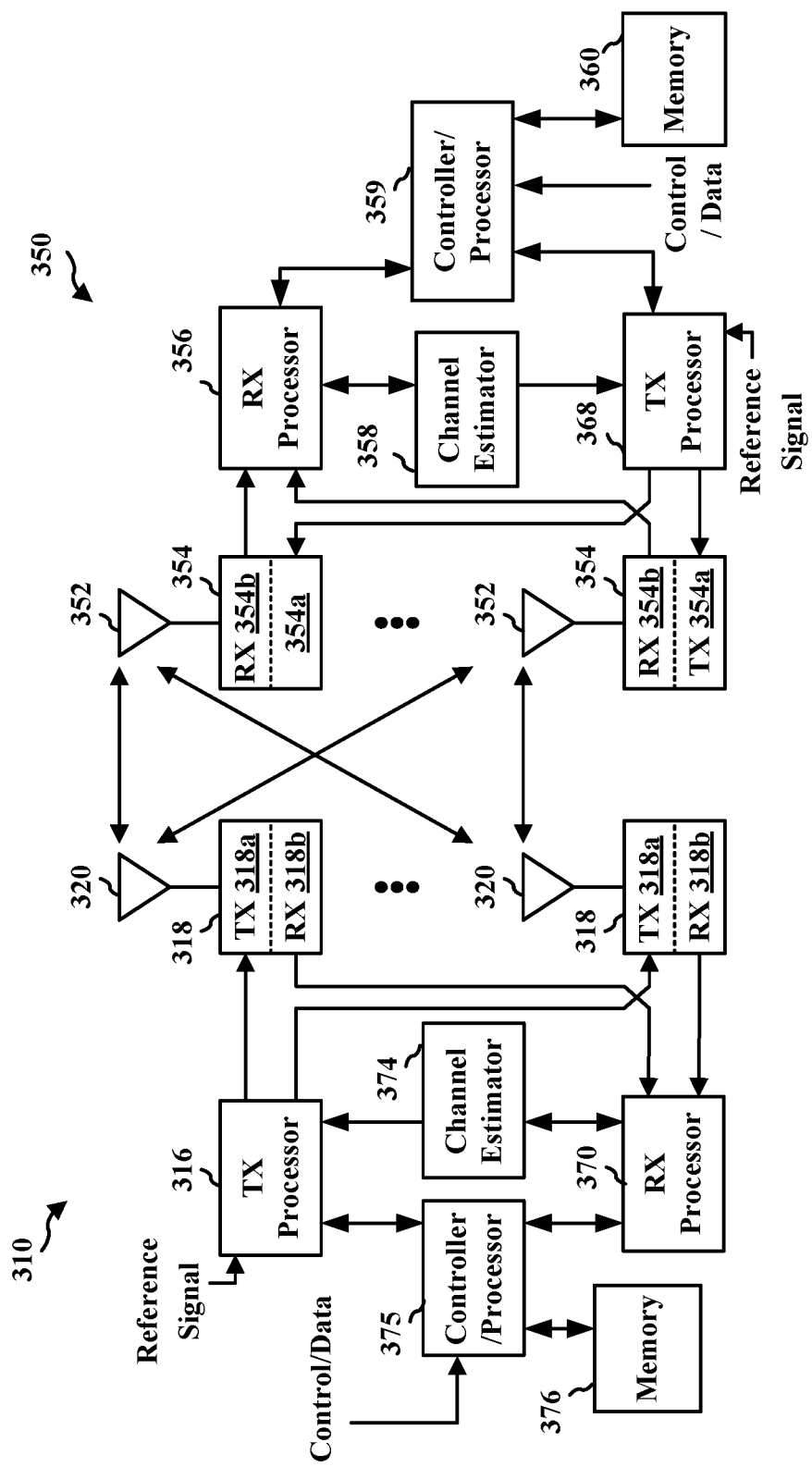
FIG. 3 is a diagram illustrating an example of a first wireless communication device and a second wireless communication device communicating in an access network based on sidelink.

FIG. 3 is a block diagram that illustrates an example of a first wireless communication device 310 that is configured to exchange wireless communication with a second wireless communication device 350 based on sidelink. In some examples, the wireless communication devices 310, 350 may communicate based on V2X or other D2D communication. The communication may be based on sidelink using a PC5 interface. The wireless communication devices 310, 350 may comprise a UE, an RSU, a base station, etc. As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with a transmission by the first wireless communication device 310, the controller/processor 359 implements layer 3 and layer 2 functionality. Layer 3 may include the RRC layer, and layer 2 may include the SDAP) layer, the PDCP layer, the RLC layer, and the MAC layer.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

A transmission received at the first wireless communication device 310 is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 may provide demultiplexing between transport and logical channels, packet reassembly, deciphering, header decompression, and/or control signal processing. The controller/processor 375 may also be responsible for error detection using an ACK and/or NACK protocol to support HARQ operations.

At least one of the TX processor 316 or 368, the RX processor 356 or 370, and the controller/processor 359 or 375 may be configured to perform aspects in connection with the transport type component 198.

A link between a UE and a base station may be established as an access link, for example, using a Uu interface. Other communication may be exchanged between wireless devices based on sidelink. For example, some UEs may communicate with each other directly using a D2D communication link, such as sidelink. Some examples of sidelink communication may include vehicle-based communication devices that can communicate from V2V, V2I (e.g., from the vehicle-based communication device to road infrastructure nodes such as an RSU), V2N (e.g., from the vehicle-based communication device to one or more network nodes, such as a base station), V2P, C-V2X, and/or a combination thereof and/or with other devices, which can be collectively referred to as vehicle-to-anything (V2X) communications. Sidelink communication may be based on V2X or other D2D communication, such as ProSe, etc.

Figure 4:
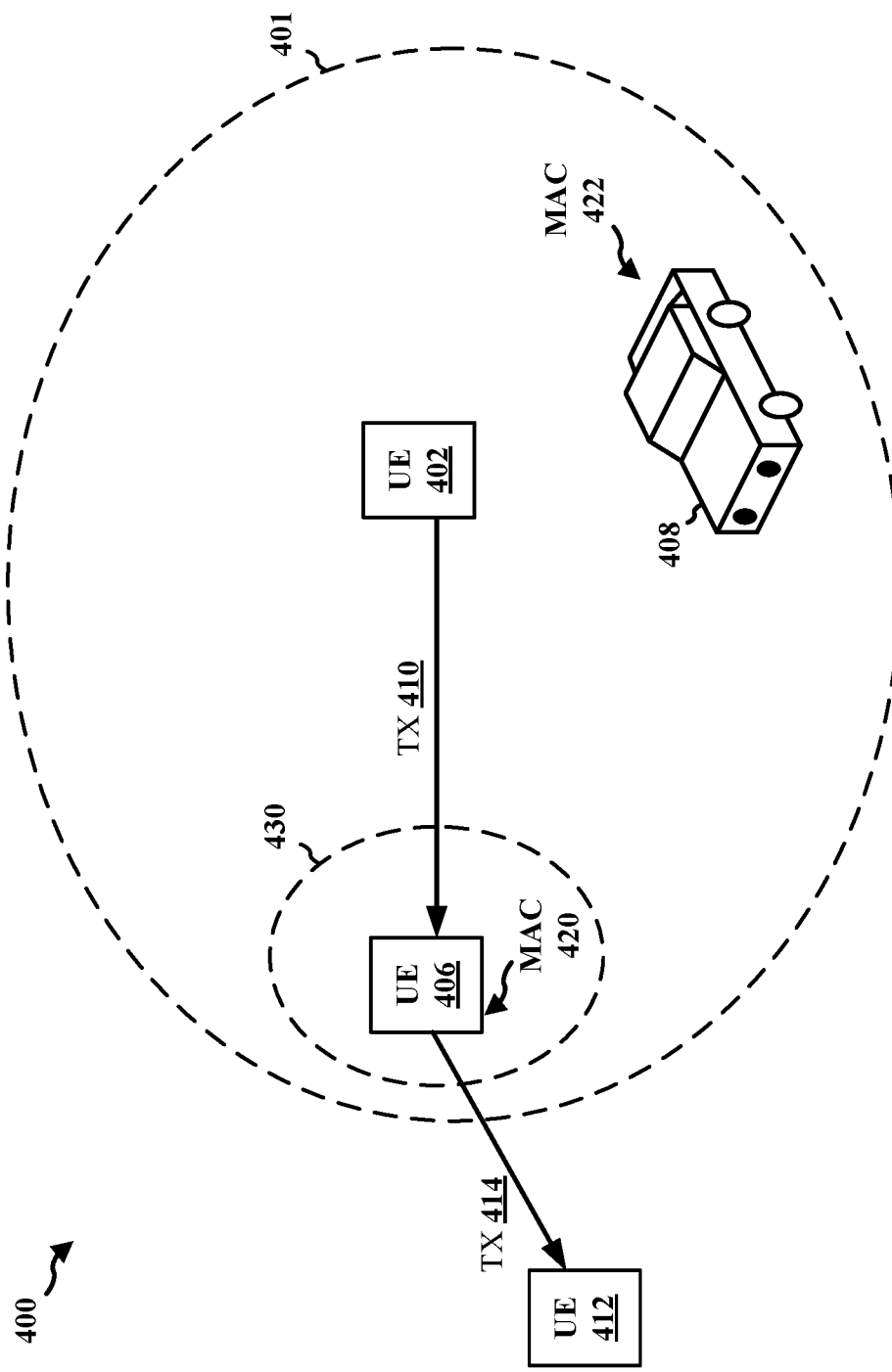
FIG. 4 illustrates an example communications environment of wireless communication between devices based on sidelink communication, in accordance with various aspects of the present disclosure.

FIG. 4 illustrates an example communications environment 400 of wireless communication between devices based on sidelink, as presented herein. The communication may be based on a slot structure comprising aspects described in connection with FIG. 2. For example, a first UE 402 may transmit a sidelink transmission 410 ("TX"), e.g., comprising a control channel (e.g., a PSCCH) and/or a corresponding data channel (e.g., a PSSCH), that may be received by a second UE 406 directly from the first UE 402 (e.g., without being transmitted through a base station).

The first UE 402 may provide SCI with information for decoding a corresponding data channel. The SCI may also include information that a receiving device may use to avoid interference. For example, the SCI may indicate time and frequency resources that will be occupied by the data transmission, and may be indicated in a control message from the transmitting device.

The UEs 402, 406 may each be capable of operating as a transmitting device in addition to operating as a receiving device. The sidelink transmission 410 may be unicast, groupcast (sometimes referred to as "multicast"), or broadcast to nearby devices. For example, the first UE 402 may transmit the sidelink transmission 410 intended for receipt by the second UE 406 (e.g. a unicast transmission), may transmit the sidelink transmission 410 intended for receipt by the second UE 406 and a vehicle UE 408 (e.g., a groupcast transmission), or may transmit the sidelink transmission 410 intended for receipt by any devices within a range 401 of the first UE 402 (e.g., a broadcast transmission).

In some examples, a UE may act as a relay between two devices. For example, the first UE 402 may generate a message for transmission to a third UE 412 that is outside the range 401 of the first UE 402. The first UE 402 may transmit the message to the second UE 406 (e.g., via the sidelink transmission 410), and the second UE 406 may forward the message to the third UE 412 (e.g., via a sidelink transmission 414).

In examples disclosed herein, when a UE transmits a transmission for sidelink communication, the transmitting UE may be referred to as a "transmitting UE" or a "transmitting device." When a UE receives a transmission via sidelink, the receiving UE may be referred to as a "receiving UE" or a "receiving device." For example, in the example of FIG. 4, the first UE 402 (e.g., a transmitting UE) may transmit the sidelink transmission 410 via sidelink. The second UE 406 (e.g., a receiving UE) may receive, via sidelink, the sidelink transmission 410.

In examples disclosed herein, when a first UE generates and transmits a sidelink communication intended for a second UE, the first UE may be referred to as a "source UE" or a "source device," and the second UE may be referred to as a "destination UE" or a "destination device." When a third UE receives the sidelink communication and is not the intended receipt (e.g., is not the destination UE), but the third UE is able to forward the sidelink communication to the intended recipient, the third UE may be referred to as a "forwarding UE" or a "forwarding device."

Sidelink communication enables a UE to communicate with another UE directly. For example, the first UE 402 and the second UE 406 may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE.

Although examples are provided for vehicular sidelink communication, the aspects presented here are applicable to non-vehicular wireless devices and are not limited to a vehicle application. For example, sidelink may also be beneficial in an industrial IoT (IIoT) environment in which sidelink can enable direct communication between a programmable logical controller (PLC) and one or more sensors/actuators (SAs) located within the IIoT environment. In such an environment, it may be beneficial for the PLC to be a wireless PLC to provide a flexible and simple deployment.

Sidelink communication may support different transport types. For example, a transmission may be unicast, groupcast, or broadcast. In some examples, a transmission may be a single-hop transmission (e.g., the sidelink transmission 410) or a multi-hop transmission (e.g., the sidelink transmissions 410, 414). In some examples, a transmission may include different addressing information. For example, a transmission may be identifier-based in which access layer functionality is used to indicate and/or identify the recipient of a message. In some examples, the access layer functionality may include a link layer address (e.g., a MAC address) associated with a destination UE. In some examples, the access layer functionality may include a range from a source UE. In some examples, the access layer functionality may include a group identifier associated with a set of one or more destination UEs. In some examples, the access layer functionality may include a UE type identifier associated with a set of one or more destination UEs. In some examples, the access layer functionality may include a link layer address (e.g., a MAC address) that may be associated with a transport type (e.g., a broadcast message). In other examples, the transmission may be position-based in which geographical positioning information may be provided to indicate the recipient and/or transmitter of a message.

Referring again to FIG. 4, in an example in which the sidelink transmission 410 is an identifier-based transmission, the sidelink transmission 410 includes a MAC address 420 associated with the second UE 406. In an example in which the sidelink transmission 410 is a position-based sidelink transmission, the sidelink transmission 410 includes a geographic position 430 associated with the second UE 406. In the illustrated example the geographic position 430 is associated with an ellipsoidal area. However, in other examples, the geographic position 430 may be associated with a circular area or a rectangular area.

The transport type may be indicated via the packet header so that a receiving device can be informed of the packet structure and decode the received packets correctly. Additionally, the lower layer of a transmitting device can use the transport type in the packet header to determine how to process a packet for transmission.

However, the different transport types may have different packet header structures. For example, source and/or destination information may be provided based on whether the transmission is a unicast, a groupcast, or a broadcast transmission. The packet header may include different hop information based on whether the transmission is a single-hop transmission or a multi-hop transmission. Additionally, the packet header may include different addressing information based on whether the source and/or destination information is identifier-based or position-based.

A geographical network layer protocol (GNLP) is a networking protocol that provides packet routing based on geographical positions. An example of a GNLP includes the GeoNetworking protocol defined by the European Telecommunications Standards Institute (ETSI). GNLP may be used in an ad-hoc network, such as a vehicular ad-hoc network, in which vehicles and/or infrastructure may exchange information, for example, to improve road safety. An ad-hoc network may refer to an infrastructure-less network in which UEs communicate with each other using wireless interfaces. Messages may travel through the network using a single-hop or a multiple-hop path between a source UE and a destination UE.

The GNLP makes use of geographical positions for packet transport within the ad-hoc network. The GNLP may support communication with individual devices (e.g., unicast) as well as the distribution of packets in geographical areas (e.g., broadcast). A GNLP device (e.g., a device or UE with the capability to support the GNLP) maintains its own geographical location (sometimes referred to as a geo position vector") based on a location system, such as Global Positioning System (GPS). The GNLP device may also maintain information about its neighbors. As used herein, the term "neighbor" refers to a device in direct (e.g., single-hop) communication range. The position of the neighbors may be obtained via beacon messages. A GNLP device may periodically broadcast a beacon message that advertises its GNLP address (e.g., an address based on the GNLP), its current position, speed, heading, station type, etc.

Figure 5:
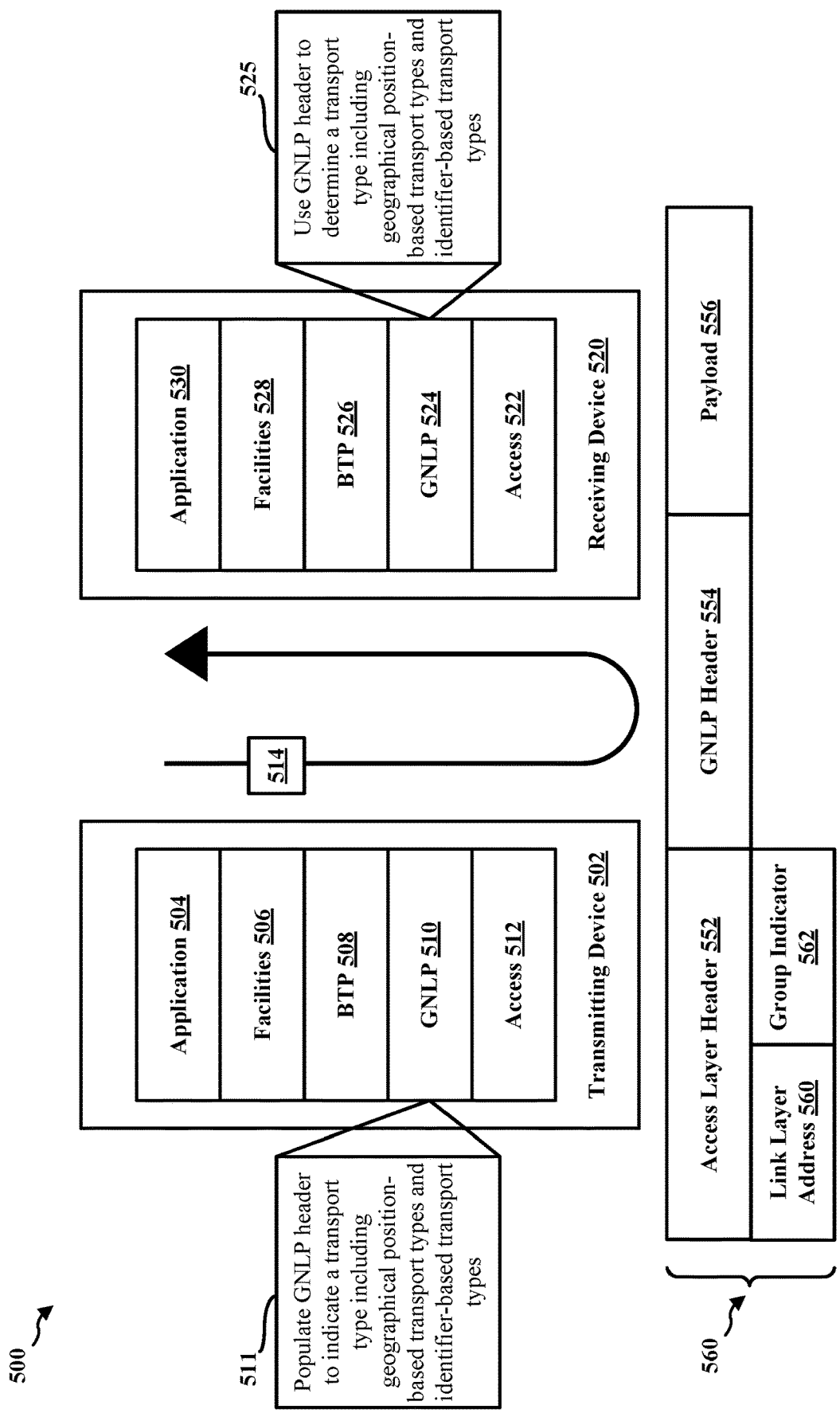
FIG. 5 illustrates an example stack to facilitate sidelink communication between a transmitting device and a receiving device, in accordance with various aspects of the present disclosure.

FIG. 5 depicts an example stack 500 to facilitate sidelink communication between a transmitting device 502 and a receiving device 520, as presented herein. The example stack 500 facilitates communication via the GNLP.

The example stack 500 includes an application layer, an example facilities layer, an example Basic Transport Protocol (BTP) layer, an example GNLP layer, and an example access layer that may perform different functions to facilitate GNLP-based communication.

At the transmitting device 502, an application layer 504 provides services. For example, the application layer 504 may trigger message generation for a service. An example facilities layer 506 provides functions, information, or services to other application, and exchanges data with lower layers. For example, the facilities layer 506 may generate a message 514 triggered by the application layer 504. A BTP layer 508 is a transport layer. For example, the BTP layer 508 may provide a port number associated with an application to the message 514. An example GNLP layer 510 provides packet routing in an ad-hoc network. For example, the GNLP layer 510 may provide geographical positions to the message 514 for the transmitting device 502 and/or the receiving device 520. For example, the GNLP layer 510 may encapsulate the message 514 into a GNLP packet and add a GNLP header 554. An example access layer 512 presents the physical layer and the data layer to communicate the message 514 to the receiving device 520. The example access layer 512 may be media-dependent. For example, for a 5G NR access network, the access layer 512 may include one or more of a non-IP layer, a PDCP layer, an RLC layer, a MAC layer, and a PHY layer. In the illustrated example, the access layer 512 may add an access layer header 552 to the message 514.

At the receiving device 520, an access layer 522 receives the message 514. Aspects of the access layer 522 may be similar to the access layer 512 of the transmitting device 502. In some examples, the access layer 522 may parse the access layer header 552 to determine how to process the message 514. A GNLP layer 524 may use the packet header of the message 514 to determine if the receiving device 520 is the intended recipient and/or how to process the message 514. For example, the GNLP layer 524 may parse the GNLP header 554 of the message 514 to determine how to further process the message 514. Aspects of the GNLP layer 524 may be similar to the GNLP layer 510 of the transmitting device 502. A BTP layer 526 may deliver the received message 514 to an application (or service) based on the port number of the message 514. Aspects of the BTP layer 526 may be similar to the BTP layer 508 of the transmitting device 502. A facilities layer 528 provides data or information of the message 514 to an application. Aspects of the facilities layer 528 may be similar to the facilities layer 506 of the transmitting device 502. An application layer 530 uses the data or information of the message 514. Aspects of the application layer 530 may be similar to the application layer 504 of the transmitting device 502.

In some examples, the BTP layer 508, 526 and the GNLP layer 510, 524 may be part of a networking layer.

In the illustrated example of FIG. 5, the message 514 has a packet structure 550 that facilitates transmission and reception of the message 514. The packet structure 550 of the message 514 includes the access layer header 552, the GNLP header 554, and a payload 556. The payload 556 may be optional and depend on the transport type of the message 514. For example, a beacon message may not include payload.

The example access layer header 552 may correspond to a header associated with an access technology used to transmit the message 514. The access layer 512 of the transmitting device 502 may generate the access layer header 552 of the message 514. The access layer 522 of the receiving device 520 may use the access layer header 552 to receive and process the message 514.

As shown in FIG. 5, the access layer header 552 may include a link layer address 560 ("LL_ADDR") that identifies a device at the link layer protocol in the respective access layer. For example, in the 5G NR access network, the link layer address 560 may correspond to a MAC address (sometimes referred to as a "MAC ID" or a "MID"). The link layer address 560 may correspond to a destination UE. In some examples, the access layer header 552 may include a link layer address associated with the source UE and/or may include a link layer address associated with another UE identifying a next hop of the message 514. As described in connection with the examples of FIGS. 8A, 8B, 8C, 10, 11A, 11B, 11C, and/or 11D, the link layer address 560 may be used to facilitate access layer functionality to identify a destination UE (e.g., when transmitting a unicast message) or an address associated with a broadcast message. For example, when the message 514 corresponds to a unicast message, the access layer 512 may populate the link layer address 560 with a MAC address associated with a destination UE. In examples in which the message 514 corresponds to a broadcast message, the access layer 512 may populate the link layer address 560 with an address associated with a broadcast. When the receiving device 520 receives the message 514, the access layer 522 may use the link layer address 560 to determine that the message 514 corresponds to a unicast message or a broadcast message. For example, when the message 514 corresponds to a unicast message, the receiving device 520 may parse the link layer address 560 to determine whether the receiving device 520 is the intended recipient of the message 514.

The example access layer header 552 may additionally or alternatively include a group indicator 562. In examples in which the message 514 corresponds to a groupcast message, the access layer 512 may populate the group indicator 562 of the message 514. The group indicator 562 may include information related to a groupcast message. For example, the group indicator 562 may include MAC addresses for each of the one or more destination UEs included in a group. In some examples, the group indicator 562 may include a group identifier. In some examples, the group indicator 562 may indicate a UE type. In some examples, the group indicator 562 may indicate a range (e.g., 100 meters). When the receiving device 520 receives the message 514, the access layer 522 may use the group indicator 562 to determine whether the receiving device 520 is the intended recipient of the groupcast message.

The example GNLP header 554 may correspond to a header associated the packet routing in an ad-hoc network. The GNLP header 554 may make use of geographical positions for packet transport. The GNLP layer 510 of the transmitting device 502 may populate the fields of the GNLP header 554 to facilitate the geographical position-based transport of the message 514. The GNLP layer 524 of the receiving device 520 may use the GNLP header 554 to receive and process the message 514. Aspects of the GNLP header 554 are described in connection with FIGS. 6A, 6B, 6C, 7A, 7B, 8A, 8B, 8C, 9A, 9B, 9C, 10, 11A, 11B, 11C, and/or 11D.

The GNLP supports different transport types. For example, the GNLP supports a beacon message, a Geo-Unicast message, a Geo-Anycast message, a Geo-Broadcast message, a Topologically-scoped Broadcast message, and a Location Service message. The addressing information of a GNLP message facilitate delivering a GNLP message to a destination device based on the geographic position of the destination device, or to a geographic target area described by a geometric shape (e.g., circular area, rectangular area, or ellipsoidal area).

A beacon message may be used by the transmitting device to periodically advertise the geographical position information of the transmitting device to its neighbors. In the example of FIG. 4, the second UE 406 may be referred to as a neighbor of the first UE 402. The third UE 412 may be referred to as a neighbor of the second UE 406, but is not a neighbor of the first UE 402.

The Geo-Unicast (GUC) message facilitates geographical position-based delivery of a message from a source UE to a destination UE. The GUC message may be a single-hop message or a multi-hop message. For example, and referring to the example of FIG. 4, the first UE 402 may generate a GUC message and include geographical position information of a destination UE in the GUC message. The first UE 402 may transmit the GUC message using the sidelink transmission 410 via unicast, groupcast, or broadcast. A UE that receives the sidelink transmission 410 may determine whether the receiving UE is the intended recipient of the GUC message and, if not, forward the GUC message to another UE and/or to the destination UE. For example, if the second UE 406 is the intended recipient of the GUC message (e.g., based on the geographical position information included in the GUC message), then the GUC message may be referred to as a single-hop GUC message. If the second UE 406 determines that it is not the intended recipient of the GUC message, the second UE 406 transmits the GUC message using sidelink transmission 414 that may be received, for example, by the third UE 412. If the third UE 412 is the intended recipient of the GUC message, then the GUC message may be referred to as a multi-hop GUC message.

The Geo-Anycast (GAC) message refers to a message that is routed from the source UE to a receiving UE that is located within a particular geographical area. In such examples, the receiving UE may be a random UE that is located within a geographical target area.

The Geo-Broadcast (GBC) message may be used to deliver a message to devices inside a particular geographic area. The parameters that describe the particular geographic area are included in the GNLP header of the GBC message. Similar to the Geo-Unicast message described above, the GBC message may be a single-hop transmission or a multi-hop transmission. When the GBC message reaches the particular geographic area, the GBC message is delivered to the devices located within the particular geographic area.

The Topologically-scoped Broadcast (TSB) message may be similar to the GBC message, but includes a particular distance, in terms of hops, from the source UE. For example, the source UE may broadcast a message that is intended for devices within a particular distance (e.g., a single-hop or multiple-hop) from the source UE.

The location service message includes a service that a transmitting device may use to determine the position of another device.

Figures 7A, 7B:
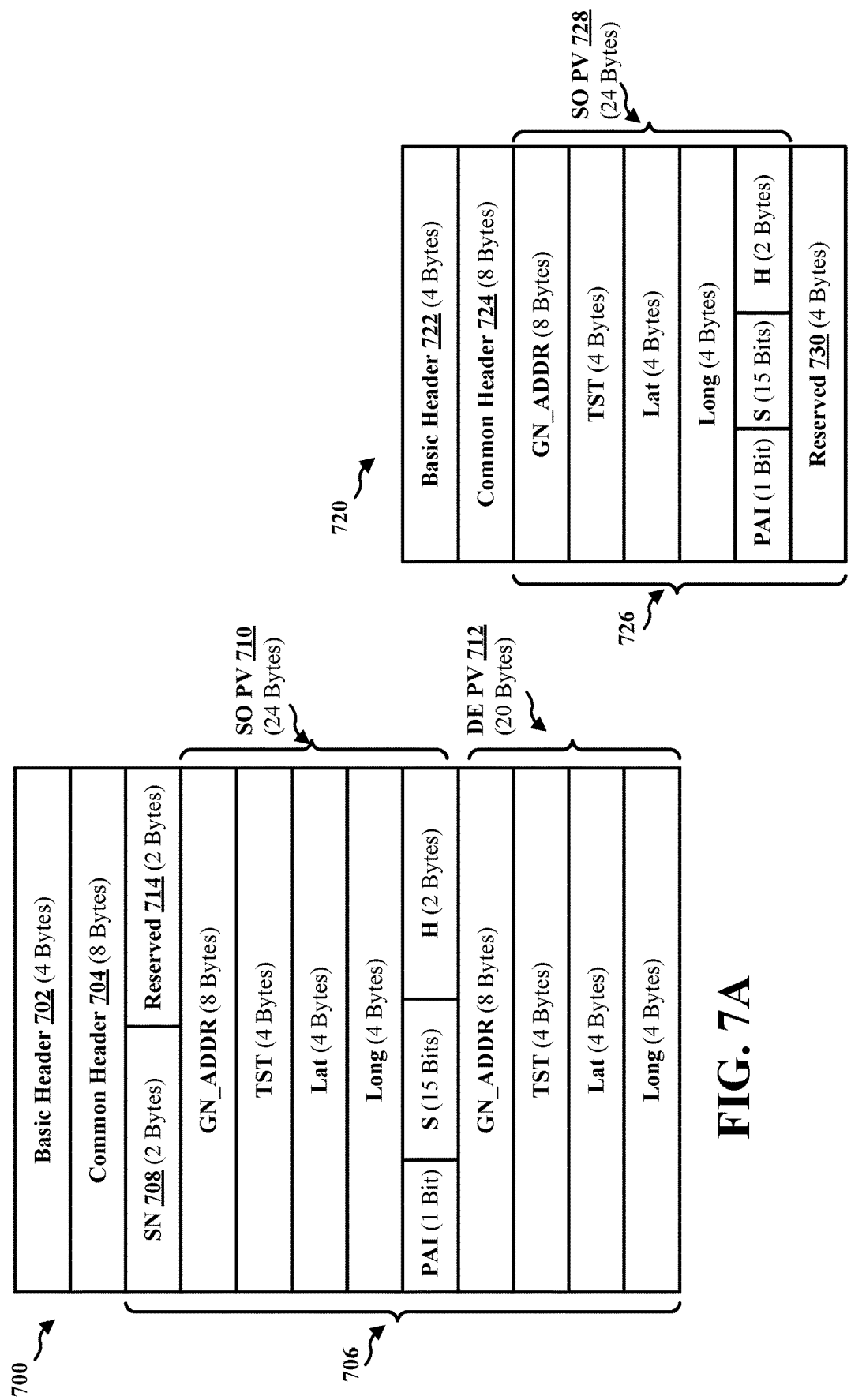
FIG. 7A illustrates an example header structure of a GNLP message that is of Geo-Unicast type, in accordance with various aspects of the present disclosure.
FIG. 7B illustrates an example header structure of a GNLP message that is of single-hop topologically-scoped broadcast type, in accordance with various aspects of the present disclosure.

A GNLP message (or packet) may include different headers. FIG. 6A depicts an example GNLP header 600 of a GNLP message, as presented herein. Aspects of the GNLP header 600 may be implemented by the GNLP header 554 of FIG. 5. The example GNLP header 600 includes a basic header 602, a common header 604, and an extended header 606. The basic header 602 and the common header 604 include fields that are included for each of the different GNLP transport types. For example, the basic header 602 may include a field indicating a version of the GNLP (e.g., a "Version" field), a field indicating a type of header immediately following the basic header (e.g., an "NH" field), a field indicating a maximum tolerable time a packet may be buffered until the packet reaches its destination (e.g., an "LT" field), a field indicating a remaining hop limit (e.g., an "RHL" field), and/or a field including reserved bits. The extended header 606 includes fields for a GUC message or a GBC message and includes fields for the definition of the geographic target area. An example of the extended header 606 for a GUC message is depicted in FIG. 7A. An example of the extended header 606 for a single-hop TSB message is depicted in FIG. 7B.

The common header 604 includes fields that are present in each GNLP message. FIG. 6B depicts example fields 610 that may be included in a common header of a GNLP message, as presented herein.

The Next Header (NH) field may indicate the type of header immediately following the GNLP header. The Header Type (HT) field may indicate the transport type of the GNLP message. The Header Sub-Type (HST) field may indicate a sub-type of the transport type of the GNLP message. The Traffic Class (TC) field may indicate facility-layer information for packet transport. The Flags field may indicate whether the transmitting device is mobile or stationary. The Payload (PL) field may indicate a length of the payload following the GNLP header. The Maximum Hop Limit (MHL) field may indicate a current hop count of the GNLP message. The Reserved field may be reserved for media-dependent functionality FIG. 6C depicts an encoding table 620 illustrating different transport types that may be encoded via a header type (HT) field 622 and a header sub-type (HST) field 624 of a common header, as presented herein. As shown in FIG. 6C, the common header field of the GNLP message may indicate that the GNLP message is a Beacon type message, a GUC type message, a GAC type message, a GBC type message, a TSB type message, or an LS type message. For example, to indicate that a GNLP message is a Geo-Unicast type message, the HT field 622 of the GNLP message is set to "2" and the HST field 624 of the GNLP message is set to "0." As another example, to indicate that a GNLP message is a Geo-Broadcast type message associated with a rectangular area, the HT field 622 of the GNLP message is set to "4" and the HST field 624 is set to "1." As another example, to indicate that a GNLP message is a single-hop Topologically-Scoped Broadcast message, the HT field 622 of the GNLP message is set to "5" and the HST field 624 is set to "0."

FIG. 7A illustrates an example header structure of a GNLP message 700 that is of Geo-Unicast type, as presented herein. In the illustrated example, the GNLP message 700 includes a basic header 702, a common header 704, and an extended header 706. Aspects of the basic header 702, the common header 704, and the extended header 706 may be implemented by the example basic header 602, the common header 604, and the extended header 606, respectively, of FIG. 6A.

Although not shown in the example of FIG. 7A, it may be appreciated that the HT field and the HST field of the common header 704 may be set to a "2" and a "0," respectively, to indicate that the GNLP message 700 is of transport type Geo-Unicast.

In the illustrated example, the extended header 706 includes a sequence number (SN) field 708 that indicates the index of the sent GUC message and may be used to detect a duplicate GNLP message. The example extended header 706 also includes a Source Position Vector (SO PV) field 710 and a Destination Position Vector (DE PV) field 712. The SO PV field 710 may indicate position information of the source UE. The DE PV field 712 may indicate position information of the destination UE. The extended header 706 may also include a reserved field 714.

The position vector fields 710, 712 of the extended header 706 include geographical positioning information. In the illustrated example of FIG. 7A, the SO PV field 710 includes a network address of the source UE (a "GN_ADDR" field), a timestamp associated with position information (a "TST" field), the position information (e.g., a latitude (a "Lat" field), a longitude (a "Long" field), etc.), an accuracy indicator of the position information (a "PAI" field), a speed of the source UE (an "S" field), and a heading of the source UE (an "H" field). In other examples, the SO PV field 710 may additionally or alternatively include an altitude of the source UE (an "Alt" field), an accuracy indicator of the timestamp (a "TAcc" field), an accuracy indicator of the speed field (an "SAcc" field), an accuracy indicator of the heading field (a "HAcc" field), and/or an accuracy indicator of the altimeter field (a "AltAcc" field). The DE PV field 712 may include one or more of a network address of the destination UE (a "GN_ADDR" field), a timestamp associated with position information (a "TST" field), and position information (e.g., a latitude (a "Lat" field), a longitude (a "Long" field), etc.).

FIG. 7B illustrates an example header structure of a GNLP message 720 that is of single-hop TSB type, as presented herein. In the illustrated example, the GNLP message 720 includes a basic header 722, a common header 724, and an extended header 726. Aspects of the basic header 722, the common header 724, and the extended header 726 may be implemented by the example basic header 602, the common header 604, and the extended header 606, respectively, of FIG. 6A.

Although not shown in the example of FIG. 7B, it may be appreciated that to indicate that the GNLP message 700 is of transport type single-hop TSB, the HT field and the HST field of the common header 724 may be encoded with a "5" and a "0," respectively.

In the illustrated example of FIG. 7B, the extended header 726 includes an SO PV field 728 and a reserved field 730. Aspects of the SO PV field 728 may be implemented by the SO PV field 710 of FIG. 7A. The example reserved field 730 may be used for media-dependent operations.

Returning again to the example of FIG. 6C, the example table 620 fails to include certain transport types. For examples, the encoding table 620 does not include a unicast transport type. As described in connection with the example of FIG. 4, the unicast transport type facilitates a source UE (e.g., the first UE 402) indicating a particular device (e.g., the second UE 406 of FIG. 4) that is the destination device. For example, the sidelink transmission 410 includes the MAC address 420 (e.g., a layer 2 address) associated with the second UE 406. Instead, the example transport types of FIG. 6C include a Geo-Unicast transport type in which a source UE indicates a particular geographical area associated with the destination device. For example, the sidelink transmission 410 may include the geographic position 430 associated with the second UE 406.

The example encoding table 620 also does not include a groupcast transport type. For example, in the example of FIG. 4, a groupcast transport type facilitates a source UE (e.g., the first UE 402) indicating a set of devices that are the destination devices. For example, the second UE 406 and the vehicle UE 408 may be associated with a group. The first UE 402 may transmit a groupcast message that is intended for the devices that are included in the group.

Aspects disclosed herein provide techniques for indicating that a GNLP message is a unicast type message or a groupcast type message in addition to the example transport types included in the encoding table 620 of FIG. 6C. In some examples, aspects disclose including a unicast type message and a groupcast type message. For example, a topologically-scoped unicast (TSU) transport type may be added to indicate when the GNLP message is a single-hop unicast (SHU) message or a multiple-hop unicast message. In a similar manner, a topologically-scoped groupcast (TSG) transport type may be added to indicate when the GNLP message is a single-hop groupcast (SHG) message or a multiple-hop groupcast message.

In some examples, a single-hop transmission (SHT) transport type may be added to indicate single-hop transmissions. A single-hop transmission may include a single-hop unicast message, a single-hop groupcast message, or a single-hop broadcast message. Thus, the SHT transport type may include header sub-types that indicate when the GNLP message is a unicast message, a groupcast message, or a broadcast message. In some examples, the SHT transport type may be added in addition to the example transport types included in the encoding table 620 of FIG. 6C. In some examples, the SHT transport type may replace the TSB transport type included in the encoding table 620 of FIG. 6C.

Additionally, as shown in FIG. 7B, the GNLP message 720 may include an SO PV field 728 including a network address indicator ("a GN_ADDR" field) and different fields related to position information. Aspects disclosed herein provide techniques for improving the header structure of a broadcast message. For example, aspects disclosed may facilitate transmitting a single-hop broadcast message while foregoing to include position information of the source UE in the single-hop broadcast message. Accordingly, the size of the message may be reduced (e.g., compared to the example of FIG. 7B), which may improve communication performance by reducing resource consumption, lowering network congestion and/or bandwidth usage, and/or increasing the quantity of messages that may be transmitted.

Additionally, when a transmission is a single-hop transmission (SHT) based on a layer 2 address (e.g., a MAC address), the GNLP header may be configured so that the header structure is the same for unicast messages, groupcast messages, and broadcast messages. For example, the GNLP header may be configured to support an SHT transport type that is cast-type independent. In some examples, the cast-type (e.g., unicast, groupcast, or broadcast) may be determined by a lower layer while processing the message. For example, the access layers 512, 522 of FIG. 5 may determine the cast-type of the SHT message. In some examples, the header sub-type of the common header may be configured to indicate whether the SHT message is a unicast message, a groupcast message, or a broadcast message.

FIG. 8A illustrates an example encoding table 800 for a unicast transmission, as presented herein. The unicast transmission may be address-based (e.g., a layer 2 address, such as a MAC address). In the illustrated example, the unicast transmission is a topologically-scoped unicast (TSU) 810 type. That is, the TSU 810 may be defined based on a particular distance, in terms of hops, from a source UE. For example, referring to the example of FIG. 4, a single-hop TSU (also referred to as a single-hop unicast (SHU)) may refer to the sidelink transmission 410 from the first UE 402 to the second UE 406. In such examples, the sidelink transmission 410 may include the MAC address 420 in the GNLP message to indicate that the destination UE is the second UE 406. A multiple-hop TSU may refer to the sidelink transmissions 410, 414 from the first UE 402 to the third UE 412. In such examples, the sidelink transmission 410 may include a MAC address associated with the third UE 412 in the GNLP message to indicate that the destination UE is the third UE 412.

As shown in FIG. 8A, to indicate that a GNLP message is a Unicast type message, an HT field 802 of the GNLP message may be encoded with a "7" and an HST field 804 of the GNLP message may be encoded with a "0" or "1" based on whether the GNLP message is an SHU message or a multiple-hop TSU message. For example, when the GNLP message is an SHU message, the HST field 804 may be encoded with a "0." When the GNLP message is a multiple-hop TSU message, the HST field 804 may be encoded with a "1."

As described above, different transport types may be associated with different headers. FIG. 8B illustrates an example header structure of a GNLP message 820 that is of SHU type (e.g., a single-hop topologically-scoped unicast message), as presented herein. In the illustrated example, the SHU GNLP message 820 includes a basic header 822, a common header 824, and an extended header 826. Aspects of the basic header 822, the common header 824, and the extended header 826 may be implemented by the example basic header 602, the common header 604, and the extended header 606, respectively, of FIG. 6A.

Although not shown in the example of FIG. 8B, it may be appreciated that the HT field of the common header 824 may be encoded with a "7" to indicate that the GNLP message 820 is of type TSU, and the HST field of the common header 824 may be encoded with a "0" to indicate that the GNLP message 820 corresponds to an SHU message.

In the illustrated example of FIG. 8B, the extended header 826 includes an SO PV field 828 and a reserved field 830. The reserved field 830 may include information related to media-dependent functions. The SO PV field 828 may indicate position information of the source UE. Aspects of the SO PV field 828 may be similar to the SO PV field 710 of FIG. 7A. For example, in the illustrated example of FIG. 8B, the SO PV field 828 includes a network address of the source UE (a "GN_ADDR" field), a timestamp associated with position information (a "TST" field), the position information (e.g., a latitude (a "Lat" field), a longitude (a "Long" field), etc.), an accuracy indicator of the position information (a "PAI" field), a speed of the source UE (an "S" field), and a heading of the source UE (an "H" field). In other examples, the SO PV field 828 may additionally or alternatively include an altitude of the source UE (an "Alt" field), an accuracy indicator of the timestamp (a "TAcc" field), an accuracy indicator of the speed field (an "SAcc" field), an accuracy indicator of the heading field (a "HAcc" field), and/or an accuracy indicator of the altimeter field (a "AltAcc" field).

As shown in FIG. 8B, aspects of the extended header 826 are similar to the example extended header 706 of the Geo-Unicast GNLP message 700. For example, the extended headers 706, 826 include the SO PV field and the reserved field. However, the example extended header 826 of the SHU GNLP message 820 may be configured to forego including position information about the destination UE (e.g., the DE PV field 712 of FIG. 7A) and a sequence number field (e.g., the SN field 708 of FIG. 7A). Instead, layer 2 addressing may be used to direct the SHU GNLP message 820 to the destination UE. For example, and referring to the example of FIG. 5, the link layer address 560 of the access layer header 552 may be populated with a layer 2 address of the destination UE, such as a MAC address. Thus, the size of the GNLP header associated with the SHU GNLP message 820 may be reduced compared to the Geo-Unicast GNLP message 700 of FIG. 7A. For example, with respect to the Geo-Unicast GNLP message 700, the extended header 706 occupies 48 Bytes. In contrast, the extended header 826 of the example of FIG. 8B occupies 28 Bytes.

In some examples, the size of the extended header of the SHU GNLP message may be further reduced. FIG. 8C illustrates another example header structure of a GNLP message 840 that is of SHU type (e.g., a single-hop topologically-scoped unicast message), as presented herein. In the illustrated example, the SHU GNLP message 840 includes a basic header 842, a common header 844, and an extended header 846. Aspects of the basic header 842, the common header 844, and the extended header 846 may be implemented by the example basic header 602, the common header 604, and the extended header 606, respectively, of FIG. 6A.

Although not shown in the example of FIG. 8C, it may be appreciated that the HT field of the common header 844 may be encoded with a "7" to indicate that the GNLP message 840 is of type TSU, and the HST field of the common header 844 may be encoded with a "0" to indicate that the GNLP message 820 corresponds to an SHU message.

In the illustrated example of FIG. 8C, the extended header 826 includes a network address of the source UE (e.g., a source GN_ADDR field 848) and a reserved field 850. The reserved field 850 may include information related to media-dependent functions. In contrast to the example of FIG. 8B, the extended header 846 of FIG. 8C includes the source GN_ADDR field 848 and foregoes including the additional position information included in the SO PV field 828. For example, the SHU GNLP message 840 is address-based and, thus, it may be appreciated that position information related to latitude, longitude, position accuracy, speed, and/or heading may be extra information and not used when transmitting the SHU GNLP message 840 to a destination UE.

Similar to the example of FIG. 8B, layer 2 addressing may be used to direct the SHU GNLP message 840 to the destination UE. For example, and referring to the example of FIG. 5, the link layer address 560 of the access layer header 552 may be populated with a layer 2 address of the destination UE, such as a MAC address. Thus, the size of the GNLP header associated with the SHU GNLP message 840 may be reduced compared to the Geo-Unicast GNLP message 700 of FIG. 7A and the SHU GNLP message 820 of FIG. 8B. For example, with respect to the SHU GNLP message 820, the extended header 826 occupies 28 Bytes. In contrast, the extended header 846 of the example of FIG. 8C occupies 12 Bytes.

As described in connection with the example encoding table 620 of FIG. 6C, a Geo-Unicast message facilitates transmitting a GNLP message from the source UE to a destination UE located at a geographic position, a Geo-Anycast message facilitates transmitting a GNLP message from the source UE to a random UE located at a geographic target area, a Geo-Broadcast message facilitates broadcasting a GNLP message from the source UE to destination UEs located at a geographic target area, and the TSB message facilitates broadcasting a GNLP message from the source UE to destination UEs located a distance (e.g. a hop-count) from the source UE.

However, in some scenarios, it may be beneficial to transmit a message to a set of UEs (e.g., a group). For example, a source UE may generate a message to transmit to UEs of a particular type (e.g., large trucks, sedans, etc.).

Figures 9A, 9B, 9C:
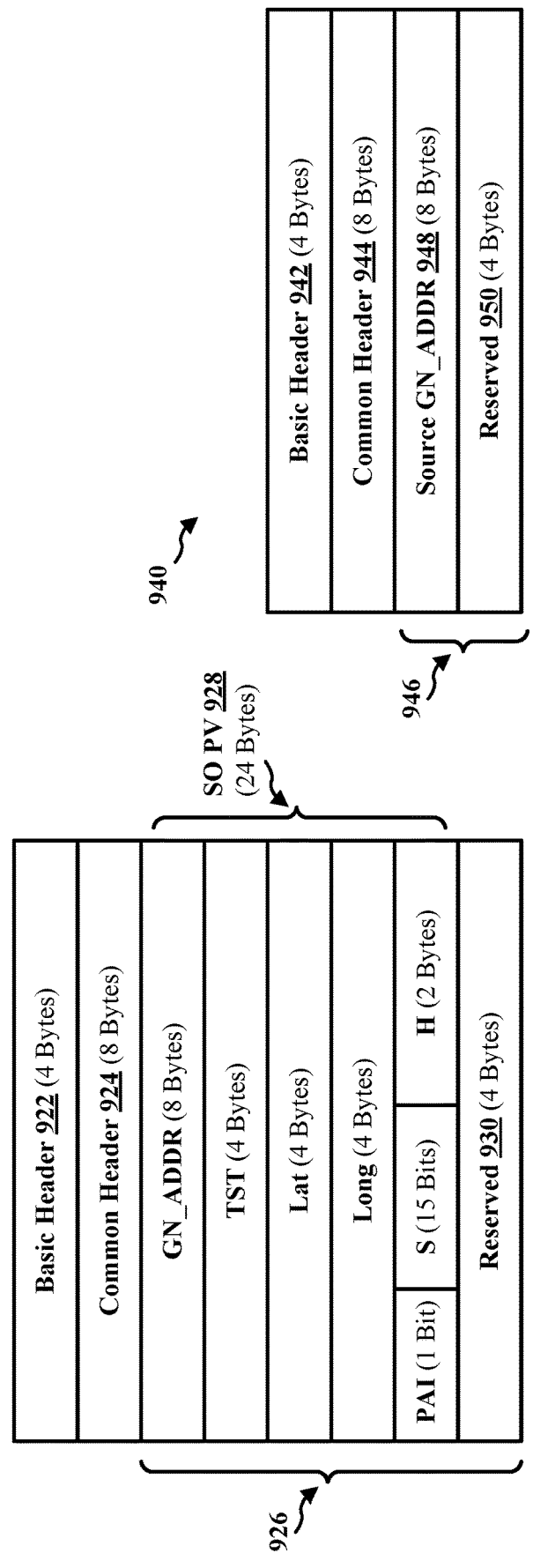
FIG. 9A illustrates an example encoding table for a groupcast transmission, in accordance with various aspects of the present disclosure.
FIG. 9B illustrates an example header structure of a single-hop topologically-scoped groupcast GNLP message, in accordance with various aspects of the present disclosure.
FIG. 9C illustrates another example header structure of a single-hop topologically-scoped groupcast GNLP message, in accordance with various aspects of the present disclosure.

FIG. 9A illustrates an example encoding table 900 for a groupcast transmission, as presented herein. The groupcast transmission may be identifier-based and may be directed to a set of one or more destination UEs. For example, the groupcast transmission may be intended for a group of UEs based on access layer (e.g., layer 2) functionality. In some examples, the access layer functionality may include address-based transmissions, such as including a link layer address (e.g., a MAC address) associated with the respective UEs of the group. In some examples, the access layer functionality may include including a group identifier with the groupcast transmission to identify the set of UEs. In some examples, the access layer functionality may include including a range (e.g., 100 meters) from the source UE that may be used to identify the UEs of the set of one or more destination UEs. In some examples, the access layer functionality may include a UE type identifier (e.g., trucks, light vehicles, etc.) that may be used to identify the UEs of the set of one or more destination UEs.

In the illustrated example, the groupcast transmission is a topologically-scoped groupcast (TSG) 910 type. That is, the TSG 910 may be defined based on a particular distance, in terms of hops, from a source UE. For example, referring to the example of FIG. 4, a single-hop TSG (also referred to as a single-hop groupcast (SHG)) may refer to a transmission of a GNLP message from the first UE 402 to a group of UEs, such as the second UE 406 and the vehicle UE 408. In such examples, the transmission may include the link layer addresses associated with the set of one or more destination UEs. For example, the GNLP message may include the MAC address 420 associated with the second UE 406 and a MAC address 422 associated with the vehicle UE 408. A multiple-hop TSG may refer to a transmission of a GNLP message form the first UE 402 to a group of UEs, such as the second UE 406, the vehicle UE 408, and the third UE 412, that are located within a particular hop count of the source UE. In such examples, the transmission may include the link layer addresses associated with the destination UEs of the group.

As shown in FIG. 9A, to indicate that a GNLP message is a Groupcast type message, an HT field 902 of the GNLP message may be encoded with "8" and an HST field 904 of the GNLP message may be encoded with "0" or "1" based on whether the GNLP message is an SHG message or a multiple-hop TSG message. For example, when the GNLP message is an SHG message, the HST field 904 may be encoded with a "0." When the GNLP message is a multiple-hop TSG message, the HST field 904 is encoded with a "1."

As described above, different transport types may be associated with different headers. FIG. 9B illustrates an example header structure of a GNLP message 920 that is of SHG type (e.g., a single-hop topologically-scoped groupcast message), as presented herein. In the illustrated example, the SHG GNLP message 920 includes a basic header 922, a common header 924, and an extended header 926. Aspects of the basic header 922, the common header 924, and the extended header 926 may be implemented by the example basic header 602, the common header 604, and the extended header 606, respectively, of FIG. 6A.

Although not shown in the example of FIG. 9B, it may be appreciated that the HT field of the common header 924 may be encoded with a "8" to indicate that the GNLP message 920 is of type TSG, and the HST field of the common header 924 may be encoded with a "0" to indicate that the GNLP message 920 corresponds to an SHG message.

In the illustrated example of FIG. 9B, the extended header 926 includes an SO PV field 928 and a reserved field 930. The reserved field 930 may include information related to media-dependent functions. The SO PV field 928 may indicate position information of the source UE. Aspects of the SO PV field 928 may be similar to the SO PV field 710 of FIG. 7A. For example, in the illustrated example of FIG. 9B, the SO PV field 928 includes a network address of the source UE (a "GN_ADDR" field), a timestamp associated with position information (a "TST" field), the position information (e.g., a latitude (a "Lat" field), a longitude (a "Long" field), etc.), an accuracy indicator of the position information (a "PAI" field), a speed of the source UE (an "S" field), and a heading of the source UE (an "H" field). In other examples, the SO PV field 928 may additionally or alternatively include an altitude of the source UE (an "Alt" field), an accuracy indicator of the timestamp (a "TAcc" field), an accuracy indicator of the speed field (a "SAcc" field), an accuracy indicator of the heading field (a "HAcc" field), and/or an accuracy indicator of the altimeter field (a "AltAcc" field).

As shown in FIG. 9B, the extended header 926 includes the SO PV field 928 and the reserved field 930. Similar to the extended header 826 of FIG. 8B, the example extended header 926 of the SHG GNLP message 920 may be configured to forego including position information about the destination UE(s) (e.g., the DE PV field 712 of FIG. 7A) and a sequence number field (e.g., the SN field 708 of FIG. 7A). Instead, layer 2 addressing may be used to direct the SHG GNLP message 920 to the destination UE. For example, and referring to the example of FIG. 5, the link layer address 560 of the access layer header 552 may be populated with a layer 2 address of the destination UE, such as a MAC address.

In some examples, the size of the extended header of the SHG GNLP message may be further reduced. FIG. 9C illustrates another example header structure of a GNLP message 940 that is of SHG type (e.g., a single-hop topologically-scoped groupcast message), as presented herein. In the illustrated example, the SHG GNLP message 940 includes a basic header 942, a common header 944, and an extended header 946. Aspects of the basic header 942, the common header 944, and the extended header 946 may be implemented by the example basic header 602, the common header 604, and the extended header 606, respectively, of FIG. 6A.

Although not shown in the example of FIG. 8C, it may be appreciated that the HT field of the common header 944 may be encoded with a "8" to indicate that the SHG GNLP message 940 is of type TSG, and the HST field of the common header 944 may be encoded with a "0" to indicate that the GNLP message 920 corresponds to an SHG message.

In the illustrated example of FIG. 9C, the extended header 926 includes a network address of the source UE (e.g., a source GN_ADDR field 948) and a reserved field 950. The reserved field 950 may include information related to media-dependent functions. In contrast to the example of FIG. 9B, the extended header 946 of FIG. 9C includes the source GN_ADDR field 948 and foregoes including the additional position information included in the SO PV field 928. For example, the SHG GNLP message 940 is address-based and, thus, it may be appreciated that position information related to latitude, longitude, position accuracy, speed, and/or heading may be extra information and not used when transmitting the SHG GNLP message 940 to one or more destination UEs of a group.

Similar to the example of FIG. 9B, layer 2 addressing may be used to direct the SHG GNLP message 940 to the destination UE(s) of a group. For example, and referring to the example of FIG. 5, the link layer address 560 of the access layer header 552 may be populated with a layer 2 address of the destination UE, such as a MAC address. Thus, the size of the GNLP header associated with the SHG GNLP message 940 may be reduced compared to the SHG GNLP message 920 of FIG. 9B. For example, with respect to the SHG GNLP message 920, the extended header 926 occupies 28 Bytes. In contrast, the extended header 946 of the example of FIG. 9C occupies 12 Bytes.

Although the above examples of FIGS. 9B and 9C describe using link layer addresses to indicate the destination UEs of the group, in other examples, additional or alternative identifiers may be included to indicate the UEs included in the group. For example, the SHG GNLP message 920, 940 may include a group identifier and each of the UEs of the group may be configured to determine that they are included in the group. In such examples, when a UE receives an SHG GNLP message 920, 940, the UE may use the group identifier to determine whether the SHG GNLP message 920, 940 is intended for the respective UE and process the SHG GNLP message 920, 940 accordingly. For example, the UE may discard the SHG GNLP message 920, 940 or may forward the SHG GNLP message 920, 940 when the respective is not included the group of UEs indicated by the group identifier.

Referring again to FIG. 6C, the example encoding table 620 includes a single-hop broadcast (SHB) message. The SHB message may be indicated by setting the HT field 622 to a "5" and setting the HST field 624 to a "0." The SHB message facilitates broadcasting a GNLP message to UEs that are located within a particular distance (e.g., a particular hop count) of the source UE. For example, and referring to the example of FIG. 4, the first UE 402 may transmit a SHB message that may be received by the one or more UEs within a single-hop count of the first UE 402 (e.g., the second UE 406 and the vehicle UE 408).

FIG. 7B illustrates the example header structure of the GNLP message 720 for an SHB transport type, as presented herein. As shown in FIG. 7B, the extended header 726 includes the SO PV field 728 and the reserved field 730. Aspects of the SO PV field 728 may be implemented by the SO PV field 710 of FIG. 7A.

Similar to the SHU GNLP message 840 of FIG. 8C and the SHG GNLP message 940 of FIG. 9C, layer 2 addressing may be used to direct an SHB message to the one or more UEs located within a single-hop count of the source UE.

Figure 10:
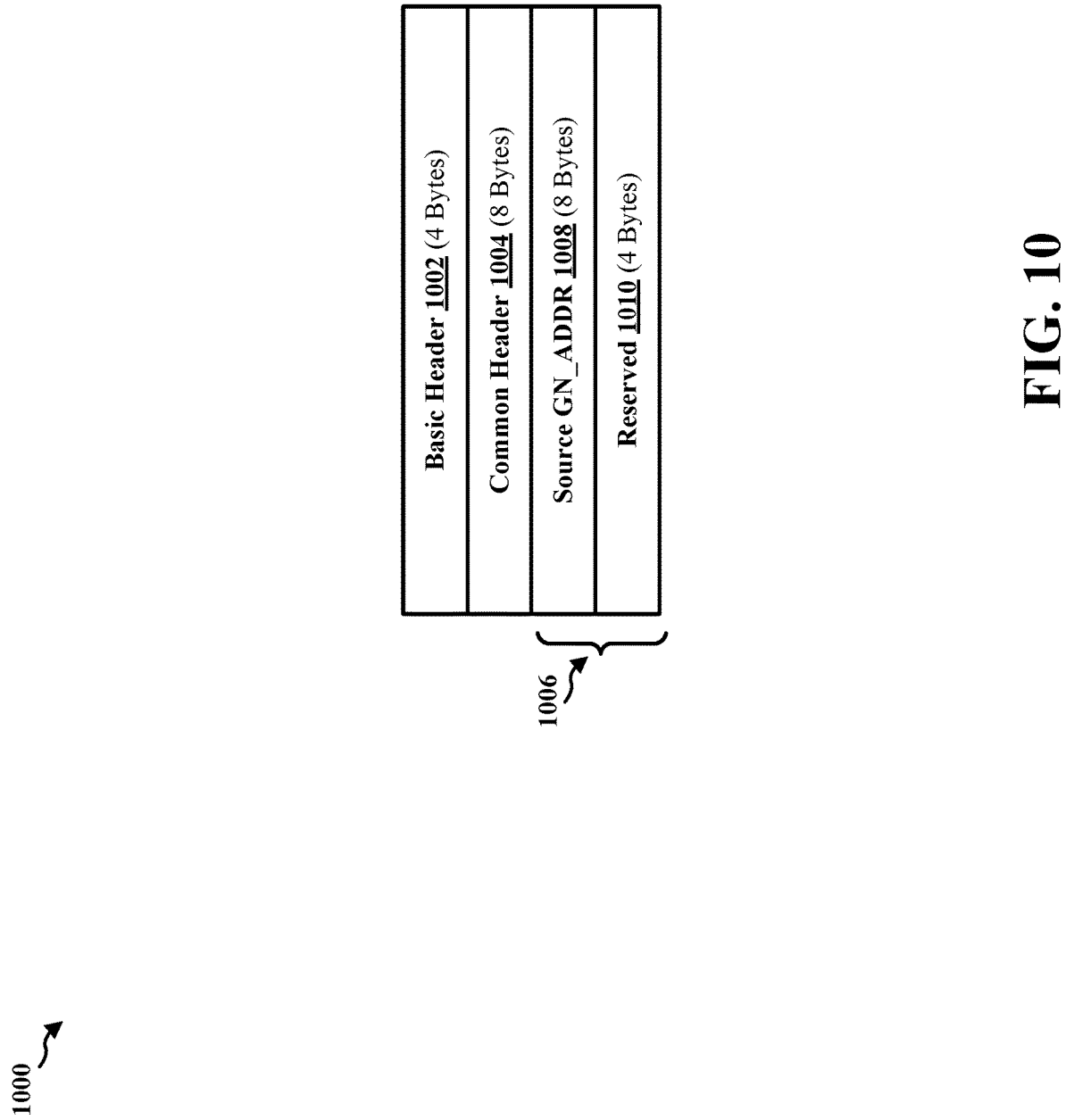
FIG. 10 illustrates an example header structure of a single-hop topologically-scoped broadcast GNLP message, in accordance with various aspects of the present disclosure.

FIG. 10 illustrates an example header structure of a GNLP message 1000 that is of SHB type (e.g., a single-hop topologically-scoped broadcast message), as presented herein. In the illustrated example, the SHB GNLP message 1000 includes a basic header 1002, a common header 1004, and an extended header 1006. Aspects of the basic header 1002, the common header 1004, and the extended header 1006 may be implemented by the example basic header 602, the common header 604, and the extended header 606, respectively, of FIG. 6A.

Although not shown in the example of FIG. 10, it may be appreciated that the HT field of the common header 1004 may be encoded with a "5" to indicate that the GNLP message 1000 is of type TSB, and the HST field of the common header 1004 may be encoded with a "0" to indicate that the GNLP message 1000 corresponds to an SHB message.

In the illustrated example of FIG. 10, the extended header 1006 includes a network address of the source UE (e.g., a source GN_ADDR field 1008) and a reserved field 1010. The reserved field 1010 may include information related to media-dependent functions. In contrast to the example of FIG. 7B, the extended header 1006 of FIG. 10 includes the source GN_ADDR field 1008 and foregoes including the additional position information included in the SO PV field 728. For example, the SHB GNLP message 1000 is address-based and, thus, it may be appreciated that position information related to latitude, longitude, position accuracy, speed, and/or heading may be extra information and not used when broadcasting the SHB GNLP message 1000 to one or more UEs within a single-hop of the source UE.

Similar to the examples of FIGS. 8C and 9C, layer 2 addressing may be used to direct the SHB GNLP message 1000 to the UE(s) within the single-hop. In additional or alternative examples, an SHB message may not be intended for a particular UE and, instead, may be broadcast to any UEs within the single-hop of the source UE. In such examples, a receiving UE may determine whether the receiving UE is an intended recipient of the SHB message based on a hop count associated with the SHB message. For example, the receiving UE may discard the SHB message when the receiving UE is located more than one hop from the source UE. Thus, it may be appreciated that position information included in the SO PV field 728 of example extended header 726 of FIG. 7B may not be useful for transmitting the SHB message. Thus, by including the source GN_ADDR field 1008 and excluding the additional position information of the SO PV field 728, the size of the GNLP header associated with the SHB GNLP message 1000 may be reduced compared to the SHB GNLP message 720 of FIG. 7B. For example, with respect to the SHB GNLP message 720, the extended header 726 occupies 28 Bytes. In contrast, the extended header 1006 of the example of FIG. 10 occupies 12 Bytes.

In the illustrated examples of FIGS. 8A, 8B, 8C, 9A, 9B, 9C, and 10, the different transport types of the GNLP message are cast-dependent. For example, examples of a unicast message are described in connection with FIGS. 8A, 8B, and 8C, examples of a groupcast message are described in connection with FIGS. 9A, 9B, and 9C, and an example of a broadcast message is described in connection with FIG. 10. However, each of the examples is directed to a single-hop transmission (e.g., a single-hop unicast (SHU) message, a single-hop groupcast (SHG) message, and a single-hop broadcast (SHB) message). Thus, it may be beneficial to include a single-hop transport type as a possible transport type of a GNLP message.

Figure 11:
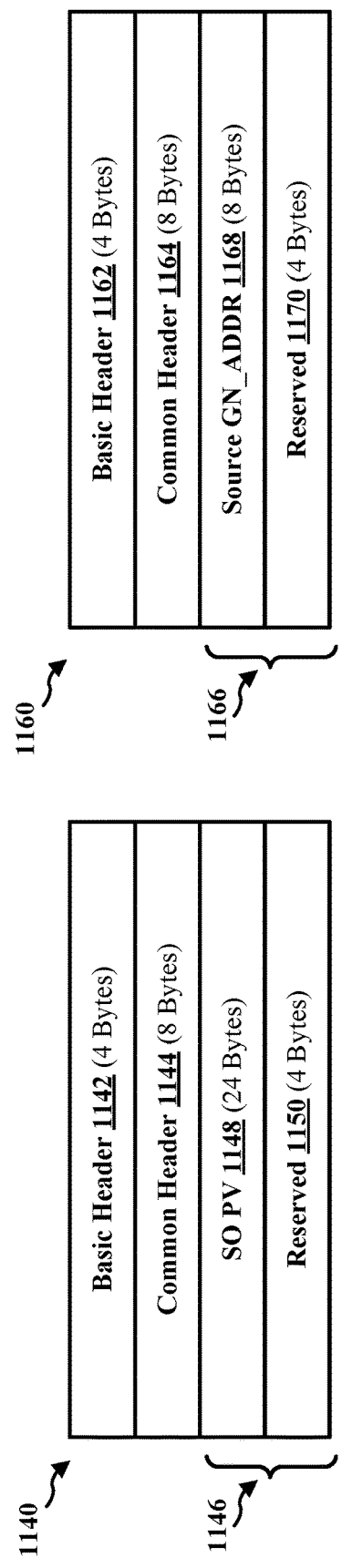
FIG. 11A illustrates an example encoding table for a single-hop transmission, in accordance with various aspects of the present disclosure.
FIG. 11B illustrates another example encoding table for a single-hop transmission, in accordance with various aspects of the present disclosure.
FIG. 11C illustrates an example header structure of a single-hop GNLP message, in accordance with various aspects of the present disclosure.
FIG. 11D illustrates another example header structure of a single-hop GNLP message, in accordance with various aspects of the present disclosure.

FIG. 11A illustrates an example encoding table 1100 for a single-hop transmission 1110, as presented herein. In the illustrated example, the single-hop transmission (SHT) 1110 is a topologically-scoped transmission of a single hop-count. That is, the SHT 1110 may be defined based on a particular distance, in terms of hops, from a source UE (e.g., one hop).

As shown in FIG. 11A, to indicate that a GNLP message is a single-hop type message, an HT field 1102 of the GNLP message may be encoded with a "9." In such examples, the HT field 1102 indicates that the GNLP message is a single-hop message, but information regarding the cast-type (e.g., unicast, groupcast, or broadcast) is excluded from the header. As described in connection with the examples of FIGS. 8A, 8B, 8C, 9A, 9B, 9C, and 10, lower layers of the transmitting device and the receiving device may facilitate processing of the GNLP message based on the cast-type. For example, for a unicast message, an access layer header (e.g., the access layer header 552 of FIG. 5) may include a link layer address to indicate an address (e.g., a MAC address) associated with a destination UE.

In some examples, the example encoding table 1100 may be added to the example transport types of FIG. 6C. In some examples, the example encoding table 1100 may replace the TSB transport type of the example transport types of FIG. 6C.

In some examples, the cast-type may be indicated via the header sub-type field. For example, FIG. 11B illustrates an example encoding table 1120 for a single-hop transmission 1130, as presented herein. As shown in FIG. 11B, to indicate that a GNLP message is a single-hop type message, an HT field 1122 of the GNLP message may be encoded with a "9" and an HST field 1124 may be encoded with a value to indicate whether the GNLP message is a unicast message, a groupcast message, or a broadcast message. For example, when the GNLP message is a single-hop unicast message, the HST field 1124 is set to "0." When the GNLP message is a single-hop groupcast message, the HST field 1124 is set to "1." When the GNLP message is a single-hop broadcast message, the HST field 1124 is set to "2."

In some examples, the example encoding table 1120 may be added to the example transport types of FIG. 6C. In some examples, the example encoding table 1120 may replace the TSB transport type of the example transport types of FIG. 6C.

FIGS. 11C and 11D illustrate example header structures of a GNLP message that is of SHT type (e.g., a single-hop transmission message). FIG. 11C illustrates an example header structure of a GNLP message 1140 that is of SHT type, as presented herein. In the illustrated example of FIG. 11C, the SHT GNLP message 1140 includes a basic header 1142, a common header 1144, and an extended header 1146. FIG. 11D illustrates another example header structure of a GNLP message 1160 that is of SHT type, as presented herein. In the illustrated example of FIG. 11D, the SHT GNLP message 1160 includes a basic header 1162, a common header 1164, and an extended header 1166. Aspects of the basic header, the common header, and the extended header of the SHT GNLP message 1140, 1160 may be implemented by the example basic header 602, the common header 604, and the extended header 606, respectively, of FIG. 6A.

Although not shown in the examples of FIGS. 11C and 11D, it may be appreciated that the HT field of the common header 1144, 1164 may be encoded with a "9" to indicate that the GNLP message 1140, 1160 is of type SHT. If the SHT transport type does not support sub-types (e.g., as described in connection with the example of FIG. 11A), then the HST field of the common header 1144, 1164 may be encoded with "0." If the SHT transport type supports sub-types (e.g., as described in connection with the example of FIG. 11B), then the HST field of the common header 1144, 1164 may be encoded with a value to indicate whether the SHT GNLP message 1140, 1160 corresponds to a single-hop unicast message (e.g., via a "0" value), to a single-hop groupcast message (e.g., via a "1" value), or to a single-hop broadcast message (e.g., via a "2" value).

In the illustrated example of FIG. 11C, the extended header 1146 includes an SO PV field 1148 and a reserved field 1150. The reserved field 1150 may include information related to media-dependent functions. The SO PV field 1148 may indicate position information of the source UE. Aspects of the SO PV field 1148 may be similar to the SO PV field 710 of FIG. 7A. For example, the SO PV field 1148 may include one or more of a network address of the source UE (a "GN_ADDR" field), a timestamp associated with position information (a "TST" field), the position information (e.g., a latitude (a "Lat" field), a longitude (a "Long" field), etc.), an accuracy indicator of the position information (a "PAI" field), a speed of the source UE (an "S" field), a heading of the source UE (an "H" field), an altitude of the source UE (an "Alt" field), an accuracy indicator of the timestamp (a "TAcc" field), an accuracy indicator of the speed field (an "SAcc" field), an accuracy indicator of the heading field (a "HAcc" field), and/or an accuracy indicator of the altimeter field (a "AltAcc" field).

The transmission and reception of the SHT GNLP message 1140 may be performed via layer 2 functionality. For example, for a unicast message, an access layer header of the SHT GNLP message 1140 may include a link layer address associated with the destination UE. For a groupcast message, an access layer header of the SHT GNLP message 1140 may include an indicator associated with a set of destination UEs, such as the link layer address associated with each of the destination UEs, a group identifier, etc. For a broadcast message, an access layer header of the SHT GNLP message 1140 may include an indicator associated with a single-hop count. Thus, the size of the GNLP header associated with the SHT GNLP message 1140 may be reduced compared to the Geo-Unicast GNLP message 700 of FIG. 7A. For example, with respect to the Geo-Unicast GNLP message 700, the extended header 706 occupies 48 Bytes. In contrast, the extended header 1146 of the example of FIG. 11C occupies 28 Bytes.

In some examples, the size of the extended header of the SHT GNLP message may be further reduced. In the illustrated example of FIG. 11D, the extended header 1166 includes a network address of the source UE (e.g., a source GN_ADDR field 1168) and a reserved field 1170. The reserved field 1170 may include information related to media-dependent functions. In contrast to the example of FIG. 11C, the extended header 1166 of FIG. 11D includes the source GN_ADDR field 1168 and foregoes including the additional position information included in the SO PV field 1148. For example, the SHT GNLP message 1160 is address-based and, thus, it may be appreciated that position information related to latitude, longitude, position accuracy, speed, and/or heading may be extra information and not used when transmitting the SHT GNLP message 1160.

Similar to the examples of FIGS. 8C, 9C, and 10, the size of the GNLP header associated with the SHT GNLP message 1160 may be reduced compared to the SHT GNLP message 1140 of FIG. 11C. For example, with respect to the SHT GNLP message 1140, the extended header 1146 occupies 28 Bytes. In contrast, the extended header 1166 of the example of FIG. 11D occupies 12 Bytes.

Figure 12:
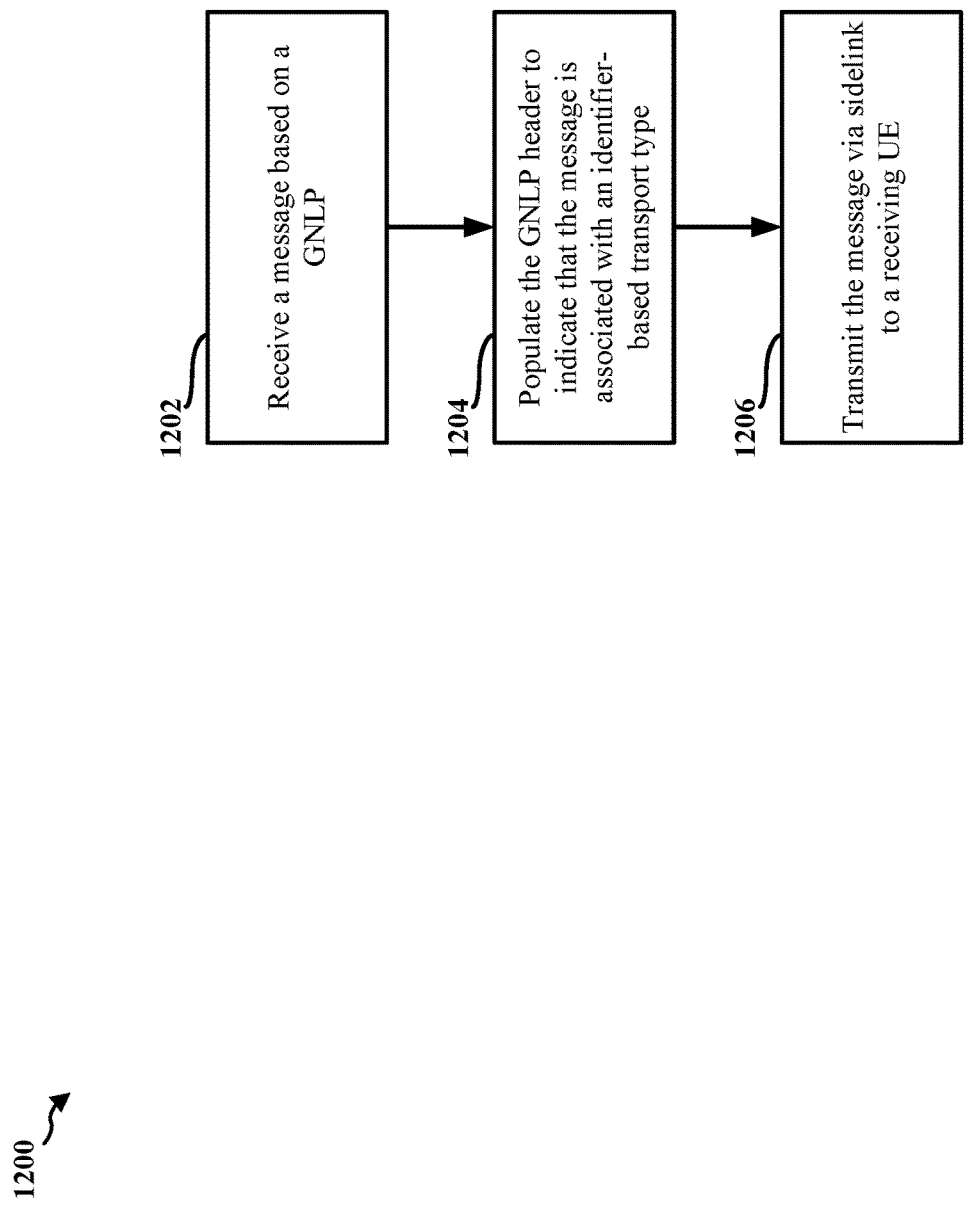
FIG. 12 is a flowchart of a method of wireless communication at a transmitting UE, in accordance with the teachings disclosed herein.

FIG. 12 is a flowchart 1200 of a method of wireless communication. The method may be performed by a transmitting UE (e.g., the UE 104, the wireless communication devices 310, 350, the transmitting device 502, and/or an apparatus 1602 of FIG. 16). The method may facilitate transmitting sidelink messages associated with identifier-based transport types to improve communication performance, for example, by improving reliability.

At 1202, the transmitting UE receives a message based on a GNLP, the message including a GNLP header, as described in connection with the message 514 and the GNLP header 554 of FIG. 5. For example, 1202 may be performed by a message component 1640 of the apparatus 1602 of FIG. 16.

At 1204, the transmitting UE populates the GNLP header to indicate that the message is associated with a single-hop transport type, the single-hop transport type including a unicast message, a groupcast message, or a broadcast message, as described in connection with 511 of FIG. 5, the GNLP message 820 of FIG. 8B, the GNLP message 840 of FIG. 8C, the GNLP message 920 of FIG. 9B, the GNLP message 940 of FIG. 9C, the GNLP message 1000 of FIG. 10, the GNLP message 1140 of FIG. 11C, and/or the GNLP message 1160 of FIG. 11D. For example, 1204 may be performed by a header component 1642 of the apparatus 1602 of FIG. 16.

In some examples, the GNLP header may include source position information associated with the transmitting UE and exclude destination position information associated with the receiving UE.

In some examples, the GNLP header may include a network address associated with the transmitting UE and exclude geographical information associated with the transmitting UE.

At 1206, the transmitting UE transmits the message via sidelink to a receiving UE, as described in connection with the message 514 of FIG. 5. For example, 1206 may be performed by a transmission component 1634 of the apparatus 1602 of FIG. 16.

In some examples, the message may correspond to a unicast message, as described in connection with the examples of FIGS. 8A, 8B, and 8C.

In some examples, the message may correspond to a groupcast message, as described in connection with the examples of FIGS. 9A, 9B, and 9C.

In some examples, the message may correspond to a broadcast message, as described in connection with the example of FIG. 10.

In some examples, the message may correspond to a single-hop transmission message, as described in connection with the examples of FIGS. 11A, 11B, 11C, and 11D.

Figure 13:
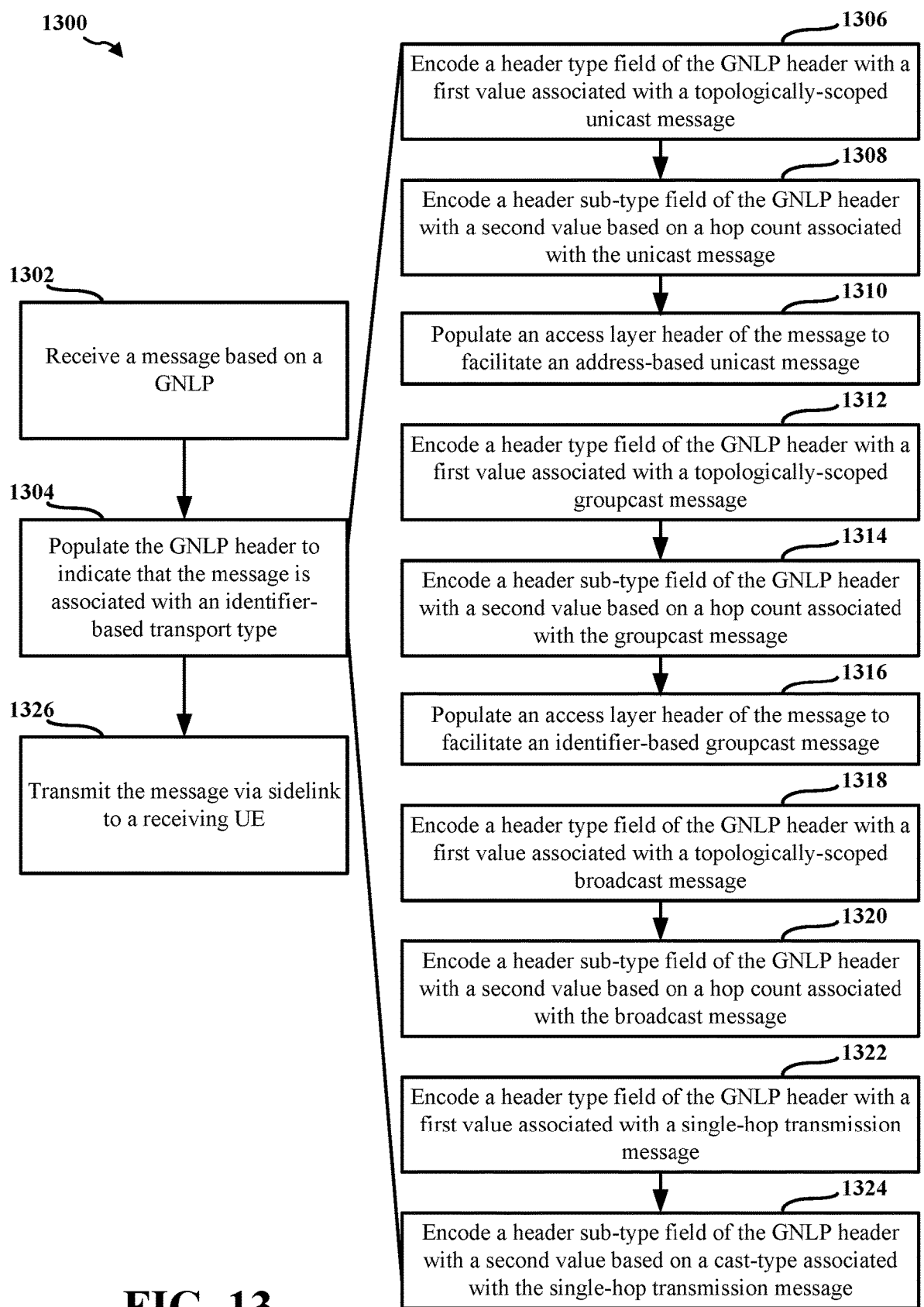
FIG. 13 is a flowchart of a method of wireless communication at a transmitting UE, in accordance with the teachings disclosed herein.

FIG. 13 is a flowchart 1300 of a method of wireless communication. The method may be performed by a transmitting UE (e.g., the UE 104, the wireless communication devices 310, 350, the transmitting device 502, and/or an apparatus 1602 of FIG. 16). The method may facilitate transmitting sidelink messages associated with identifier-based transport types to improve communication performance, for example, by improving reliability.

At 1302, the transmitting UE receives a message based on a GNLP, the message including a GNLP header, as described in connection with the message 514 and the GNLP header 554 of FIG. 5. For example, 1302 may be performed by a message component 1640 of the apparatus 1602 of FIG. 16.

At 1304, the transmitting UE populates the GNLP header to indicate that the message is associated with a single-hop transport type, the single-hop transport type including a unicast message, a groupcast message, or a broadcast message, as described in connection with 511 of FIG. 5, the GNLP message 820 of FIG. 8B, the GNLP message 840 of FIG. 8C, the GNLP message 920 of FIG. 9B, the GNLP message 940 of FIG. 9C, the GNLP message 1000 of FIG. 10, the GNLP message 1140 of FIG. 11C, and/or the GNLP message 1160 of FIG. 11D. For example, 1304 may be performed by a header component 1642 of the apparatus 1602 of FIG. 16.

At 1326, the transmitting UE transmits the message via sidelink to a receiving UE, as described in connection with the message 514 of FIG. 5. For example, 1326 may be performed by a transmission component 1634 of the apparatus 1602 of FIG. 16.

In some examples, the message may correspond to a unicast message, as described in connection with the examples of FIGS. 8A, 8B, and 8C. For example, at 1306, the transmitting UE may encode a header type field of the GNLP header with a first value associated with a topologically-scoped unicast message, as described in connection with the HT field 802 of the encoding table 800 of FIG. 8A. For example, 1306 may be performed by a unicast component 1644 of the apparatus 1602 of FIG. 16. At 1308, the transmitting UE may encode a header sub-type field of the GNLP header with a second value based on a hop count associated with the unicast message, as described in connection with the example HST field 804 of the encoding table 800 of FIG. 8A. For example, 1308 may be performed by the unicast component 1644 of the apparatus 1602 of FIG. 16. At 1310, the transmitting UE may populate an access layer header of the message to facilitate an address-based unicast message, as described in connection with the link layer address 560 of FIG. 5. For example, 1310 may be performed by the unicast component 1644 of the apparatus 1602 of FIG. 16.

In some examples, the GNLP header may include source position information associated with the transmitting UE and exclude destination position information associated with the receiving UE, as described in connection with the example GNLP message 820 of FIG. 8B.

In some examples, the GNLP header may include a network address associated with the transmitting UE and exclude geographical information associated with the transmitting UE, as described in connection with the example GNLP message 840 of FIG. 8C.

In some examples, the message may correspond to a groupcast message, as described in connection with the examples of FIGS. 9A, 9B, and 9C. For example, at 1312, the transmitting UE may encode a header type field of the GNLP header with a first value associated with a topologically-scoped groupcast message, as described in connection with the HT field 902 of the encoding table 900 of FIG. 9A. For example, 1312 may be performed by a groupcast component 1646 of the apparatus 1602 of FIG. 16. At 1314, the transmitting UE may encode a header sub-type field of the GNLP header with a second value based on a hop count associated with the groupcast message, as described in connection with the example HST field 904 of the encoding table 900 of FIG. 9A. For example, 1314 may be performed by the groupcast component 1646 of the apparatus 1602 of FIG. 16. At 1316, the transmitting UE may populate an access layer header of the message to facilitate an identifier-based groupcast message, as described in connection with the group indicator 562 of FIG. 5. For example, 1316 may be performed by the groupcast component 1646 of the apparatus 1602 of FIG. 16.

In some examples, the GNLP header may include source position information associated with the transmitting UE and exclude destination position information associated with the receiving UE, as described in connection with the example GNLP message 920 of FIG. 9B.

In some examples, the GNLP header may include a network address associated with the transmitting UE and exclude geographical information associated with the transmitting UE, as described in connection with the example GNLP message 940 of FIG. 9C.

In some examples, the message may correspond to a broadcast message, as described in connection with the example of FIG. 10. For example, at 1318, the transmitting UE may encode a header type field of the GNLP header with a first value associated with a topologically-scoped broadcast message, as described in connection with the HT field 622 of the encoding table 620 of FIG. 6C. For example, 1318 may be performed by a broadcast component 1648 of the apparatus 1602 of FIG. 16. At 1320, the transmitting UE may encode a header sub-type field of the GNLP header with a second value based on a hop count associated with the broadcast message, as described in connection with the example HST field 624 of the encoding table 620 of FIG. 6C. For example, 1320 may be performed by the broadcast component 1648 of the apparatus 1602 of FIG. 16.

In some examples, the GNLP header may include a network address associated with the transmitting UE and exclude geographical information associated with the transmitting UE, as described in connection with the example GNLP message 940 of FIG. 9C.

In some examples, the message may correspond to a single-hop transmission message, as described in connection with the examples of FIGS. 11A, 11B, 11C, and 11D. For example, at 1322, the transmitting UE may encode a header type field of the GNLP header with a first value associated with the single-hop transmission message, as described in connection with the HT field 1102 of the encoding table 1100 of FIG. 11A, and/or the HT field 1122 of the encoding table 1120 of FIG. 11B. For example, 1322 may be performed by a single-hop component 1650 of the apparatus 1602 of FIG. 16. At 1324, the transmitting UE may encode a header sub-type field of the GNLP header with a second value based on a cast-type associated with the single-hop transmission message, as described in connection with the example HST field 1124 of the encoding table 1120 of FIG. 11B. For example, 1324 may be performed by the single-hop component 1650 of the apparatus 1602 of FIG. 16.

In some examples, the GNLP header may include source position information associated with the transmitting UE and exclude destination position information associated with the receiving UE, as described in connection with the example GNLP message 1140 of FIG. 11C.

In some examples, the GNLP header may include a network address associated with the transmitting UE and exclude geographical information associated with the transmitting UE, as described in connection with the example GNLP message 1160 of FIG. 11D.

Figure 14:
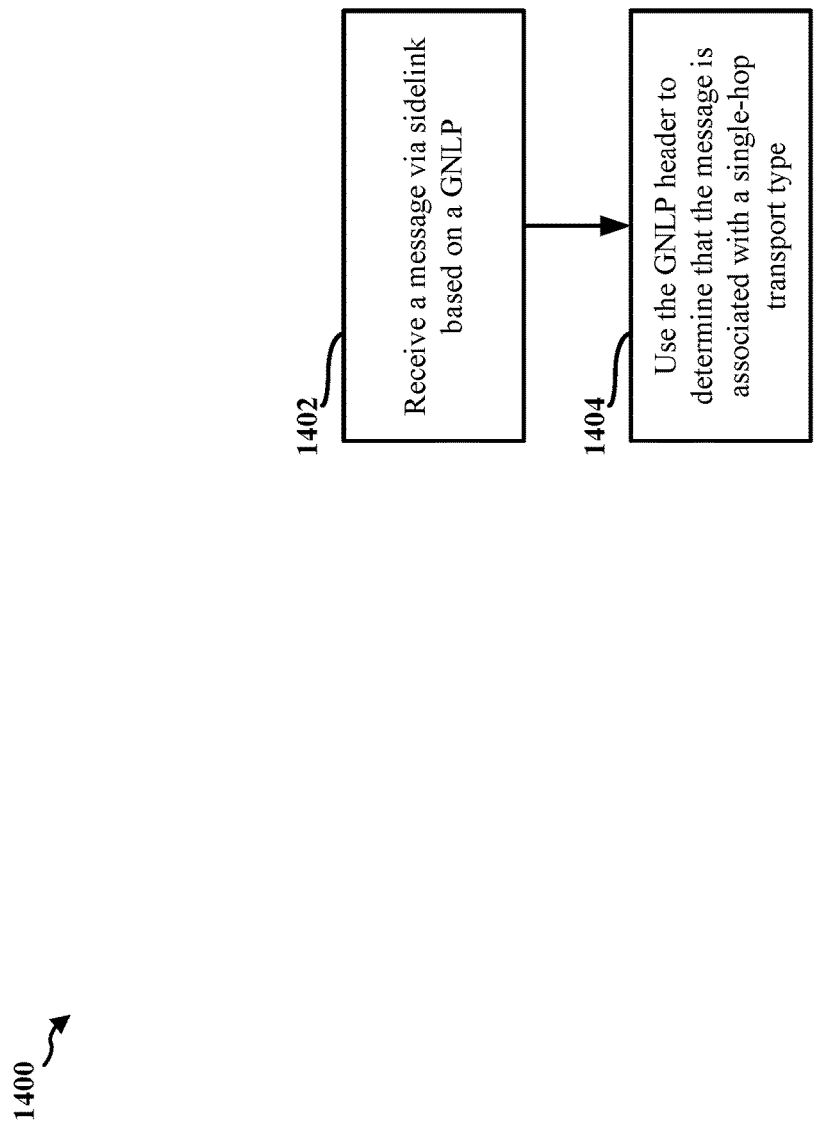
FIG. 14 is a flowchart of a method of wireless communication at a receiving UE, in accordance with the teachings disclosed herein.

FIG. 14 is a flowchart 1400 of a method of wireless communication. The method may be performed by a receiving UE (e.g., the UE 104, the wireless communication devices 310, 350, the receiving device 520, and/or an apparatus 1602 of FIG. 16). The method may facilitate receiving sidelink messages associated with identifier-based transport types to improve communication performance, for example, by improving reliability.

At 1402, the receiving UE receives, from a transmitting UE, a message via sidelink, the message based on a GNLP and including a GNLP header, as described in connection with the message 514 and the GNLP header 554 of FIG. 5. For example, 1402 may be performed by a message component 1640 of the apparatus 1602 of FIG. 16.

At 1404, the receiving UE uses the GNLP header to determine that the message is associated with a single-hop transport type, the single-hop transport type including a unicast message, a groupcast message, or a broadcast message, as described in connection with 525 of FIG. 5, the GNLP message 820 of FIG. 8B, the GNLP message 840 of FIG. 8C, the GNLP message 920 of FIG. 9B, the GNLP message 940 of FIG. 9C, the GNLP message 1000 of FIG. 10, the GNLP message 1140 of FIG. 11C, and/or the GNLP message 1160 of FIG. 11D. For example, 1404 may be performed by a header component 1642 of the apparatus 1602 of FIG. 16.

In some examples, the message may correspond to a unicast message, as described in connection with the examples of FIGS. 8A, 8B, and 8C. For example, the GNLP header may include a header type field including a first value associated with a topologically-scoped unicast message, as described in connection with the HT field 802 of the encoding table 800 of FIG. 8A. The GNLP header may also include a header sub-type field including a second value based on a hop count associated with the unicast message, as described in connection with the example HST field 804 of the encoding table 800 of FIG. 8A.

In some examples, the GNLP header may include source position information associated with the transmitting UE and exclude destination position information associated with the receiving UE, as described in connection with the example GNLP message 820 of FIG. 8B.

In some examples, the GNLP header may include a network address associated with the transmitting UE and exclude geographical information associated with the transmitting UE, as described in connection with the example GNLP message 840 of FIG. 8C.

In some examples, the message may correspond to a groupcast message, as described in connection with the examples of FIGS. 9A, 9B, and 9C. For example, the GNLP header may include a header type field including a first value associated with a topologically-scoped groupcast message, as described in connection with the HT field 902 of the encoding table 900 of FIG. 9A. The GNLP header may also include a header sub-type field including a second value based on a hop count associated with the groupcast message, as described in connection with the example HST field 904 of the encoding table 900 of FIG. 9A.

In some examples, the GNLP header may include source position information associated with the transmitting UE and exclude destination position information associated with the receiving UE, as described in connection with the example GNLP message 920 of FIG. 9B.

In some examples, the GNLP header may include a network address associated with the transmitting UE and exclude geographical information associated with the transmitting UE, as described in connection with the example GNLP message 940 of FIG. 9C.

In some examples, the message may correspond to a broadcast message, as described in connection with the example of FIG. 10. For example, the GNLP header may include a header type field including a first value associated with a topologically-scoped broadcast message, as described in connection with the HT field 622 of the encoding table 620 of FIG. 6C. The GNLP header may also include a header sub-type field including a second value based on a hop count associated with the broadcast message, as described in connection with the example HST field 624 of the encoding table 620 of FIG. 6C.

In some examples, the GNLP header may include a network address associated with the transmitting UE and exclude geographical information associated with the transmitting UE, as described in connection with the example GNLP message 940 of FIG. 9C.

In some examples, the message may correspond to a single-hop transmission message, as described in connection with the examples of FIGS. 11A, 11B, 11C, and 11D. For example, the GNLP header may include a header type field including a first value associated with the single-hop transmission message, as described in connection with the HT field 1102 of the encoding table 1100 of FIG. 11A, and/or the HT field 1122 of the encoding table 1120 of FIG. 11B. The GNLP header may also include a header sub-type field including a second value based on a cast-type associated with the single-hop transmission message, as described in connection with the example HST field 1124 of the encoding table 1120 of FIG. 11B.

In some examples, the GNLP header may include source position information associated with the transmitting UE and exclude destination position information associated with the receiving UE, as described in connection with the example GNLP message 1140 of FIG. 11C.

In some examples, the GNLP header may include a network address associated with the transmitting UE and exclude geographical information associated with the transmitting UE, as described in connection with the example GNLP message 1160 of FIG. 11D.

Figure 15:
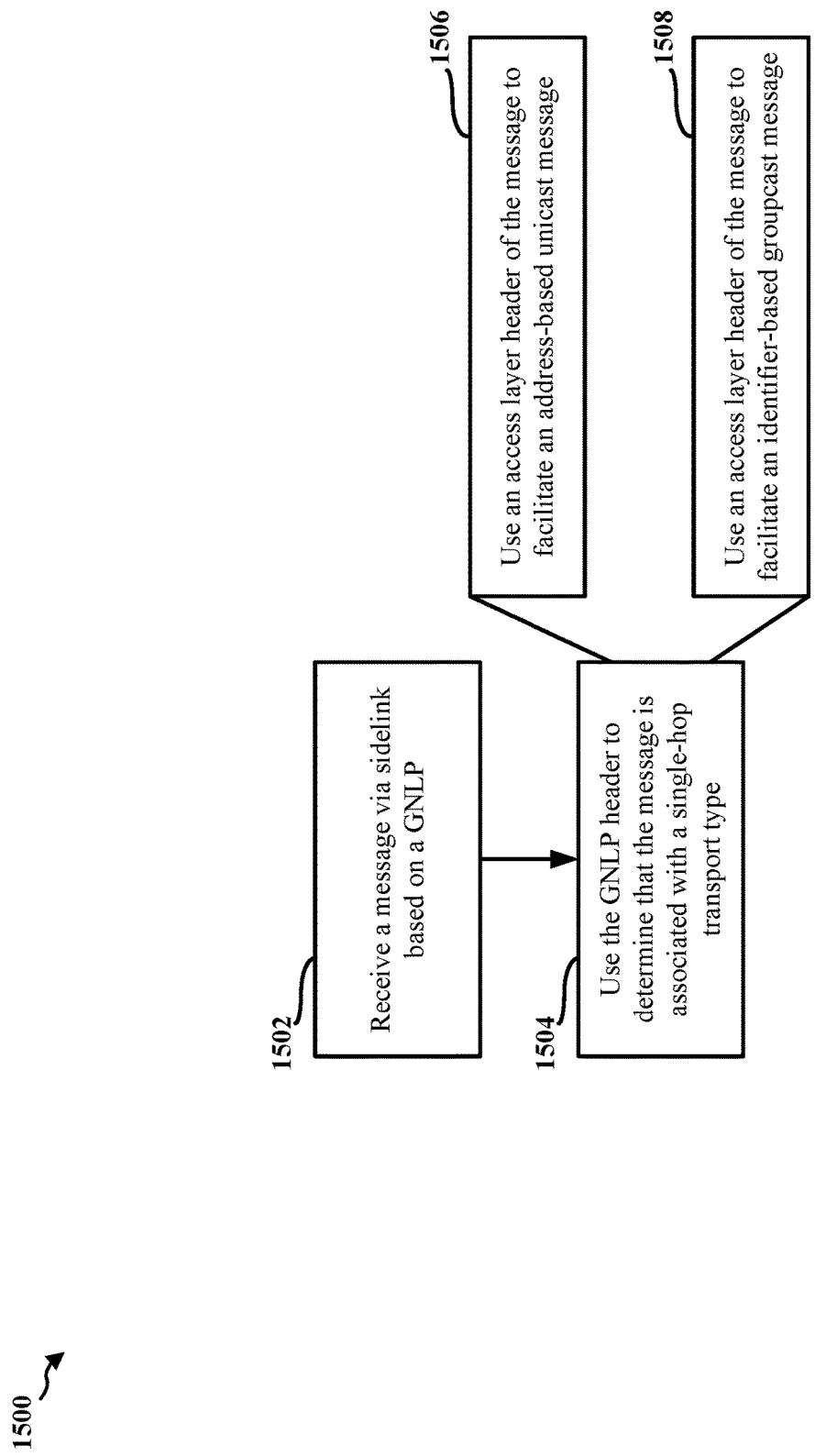
FIG. 15 is a flowchart of a method of wireless communication at a receiving UE, in accordance with the teachings disclosed herein.

FIG. 15 is a flowchart 1500 of a method of wireless communication. The method may be performed by a receiving UE (e.g., the UE 104, the wireless communication devices 310, 350, the receiving device 520, and/or an apparatus 1602 of FIG. 16). The method may facilitate receiving sidelink messages associated with identifier-based transport types to improve communication performance, for example, by improving reliability.

At 1502, the receiving UE receives, from a transmitting UE, a message via sidelink, the message based on a GNLP and including a GNLP header, as described in connection with the message 514 and the GNLP header 554 of FIG. 5. For example, 1502 may be performed by a message component 1640 of the apparatus 1602 of FIG. 16.

At 1504, the receiving UE uses the GNLP header to determine that the message is associated with a single-hop transport type, the single-hop transport type including a unicast message, a groupcast message, or a broadcast message, as described in connection with 525 of FIG. 5, the GNLP message 820 of FIG. 8B, the GNLP message 840 of FIG. 8C, the GNLP message 920 of FIG. 9B, the GNLP message 940 of FIG. 9C, the GNLP message 1000 of FIG. 10, the GNLP message 1140 of FIG. 11C, and/or the GNLP message 1160 of FIG. 11D. For example, 1504 may be performed by a header component 1642 of the apparatus 1602 of FIG. 16.

In some examples, the message may correspond to a unicast message, as described in connection with the examples of FIGS. 8A, 8B, and 8C. For example, the GNLP header may include a header type field including a first value associated with a topologically-scoped unicast message, as described in connection with the HT field 802 of the encoding table 800 of FIG. 8A. The GNLP header may also include a header sub-type field including a second value based on a hop count associated with the unicast message, as described in connection with the example HST field 804 of the encoding table 800 of FIG. 8A.

At 1506, the receiving UE may use an access layer header of the message to facilitate an address-based unicast message, as described in connection with the link layer address 560 of FIG. 5. For example, 1506 may be performed by the unicast component 1644 of the apparatus 1602 of FIG. 16.

In some examples, the GNLP header may include source position information associated with the transmitting UE and exclude destination position information associated with the receiving UE, as described in connection with the example GNLP message 820 of FIG. 8B.

In some examples, the GNLP header may include a network address associated with the transmitting UE and exclude geographical information associated with the transmitting UE, as described in connection with the example GNLP message 840 of FIG. 8C.

In some examples, the message may correspond to a groupcast message, as described in connection with the examples of FIGS. 9A, 9B, and 9C. For example, the GNLP header may include a header type field including a first value associated with a topologically-scoped groupcast message, as described in connection with the HT field 902 of the encoding table 900 of FIG. 9A. The GNLP header may also include a header sub-type field including a second value based on a hop count associated with the groupcast message, as described in connection with the example HST field 904 of the encoding table 900 of FIG. 9A.

At 1508, the receiving UE may use an access layer header of the message to facilitate an identifier-based groupcast message, as described in connection with the group indicator 562 of FIG. 5. For example, 1508 may be performed by the groupcast component 1646 of the apparatus 1602 of FIG. 16.

In some examples, the GNLP header may include source position information associated with the transmitting UE and exclude destination position information associated with the receiving UE, as described in connection with the example GNLP message 920 of FIG. 9B.

In some examples, the GNLP header may include a network address associated with the transmitting UE and exclude geographical information associated with the transmitting UE, as described in connection with the example GNLP message 940 of FIG. 9C.

In some examples, the message may correspond to a broadcast message, as described in connection with the example of FIG. 10. For example, the GNLP header may include a header type field including a first value associated with a topologically-scoped broadcast message, as described in connection with the HT field 622 of the encoding table 620 of FIG. 6C. The GNLP header may also include a header sub-type field including a second value based on a hop count associated with the broadcast message, as described in connection with the example HST field 624 of the encoding table 620 of FIG. 6C.

In some examples, the GNLP header may include a network address associated with the transmitting UE and exclude geographical information associated with the transmitting UE, as described in connection with the example GNLP message 940 of FIG. 9C.

In some examples, the message may correspond to a single-hop transmission message, as described in connection with the examples of FIGS. 11A, 11B, 11C, and 11D. For example, the GNLP header may include a header type field including a first value associated with the single-hop transmission message, as described in connection with the HT field 1102 of the encoding table 1100 of FIG. 11A, and/or the HT field 1122 of the encoding table 1120 of FIG. 11B. The GNLP header may also include a header sub-type field including a second value based on a cast-type associated with the single-hop transmission message, as described in connection with the example HST field 1124 of the encoding table 1120 of FIG. 11B.

In some examples, the GNLP header may include source position information associated with the transmitting UE and exclude destination position information associated with the receiving UE, as described in connection with the example GNLP message 1140 of FIG. 11C.

In some examples, the GNLP header may include a network address associated with the transmitting UE and exclude geographical information associated with the transmitting UE, as described in connection with the example GNLP message 1160 of FIG. 11D.

Figure 16:
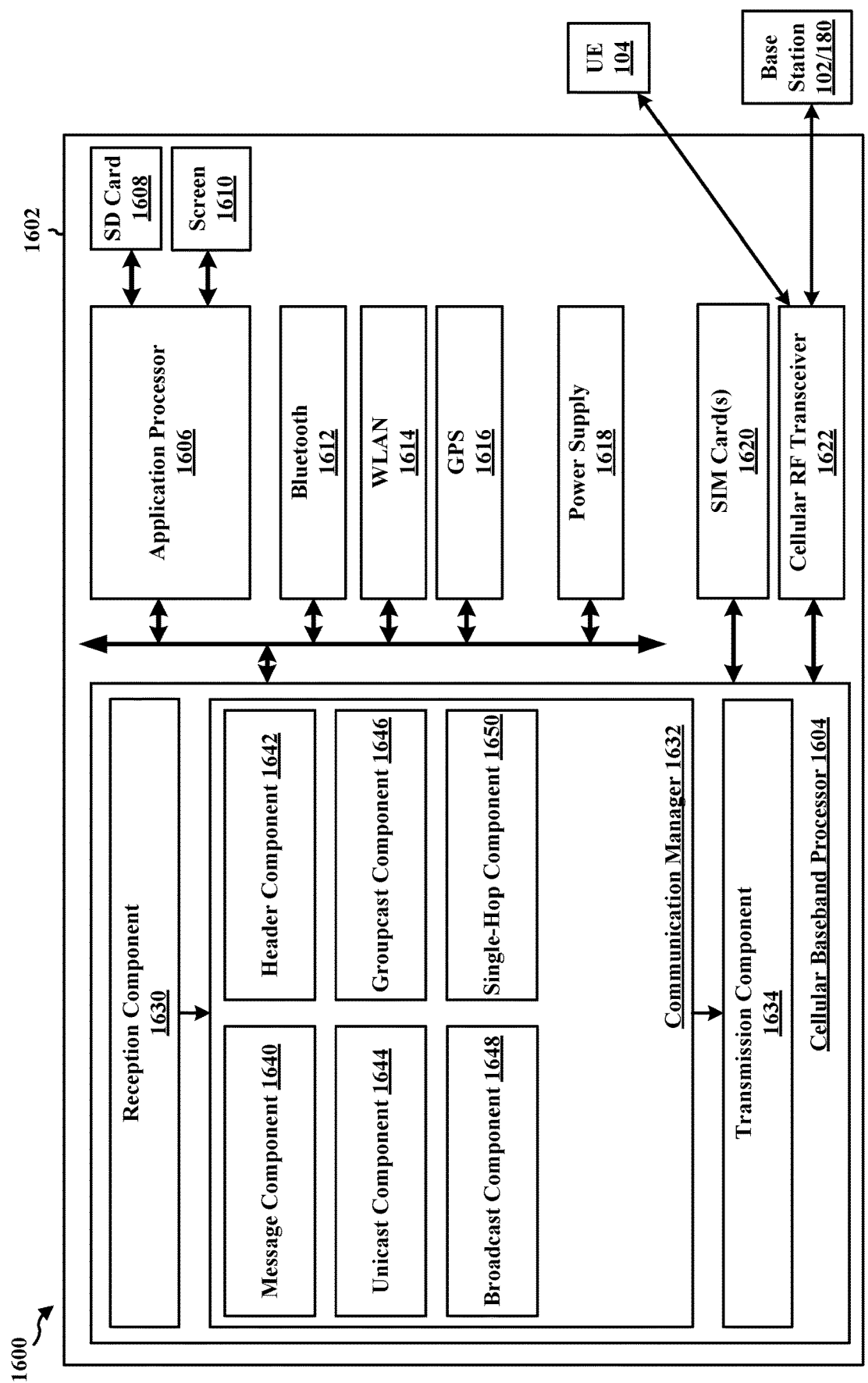
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 is a sidelink device, such as a UE, and includes cellular baseband processor 1604 (also referred to as a modem) coupled to a cellular RF transceiver 1622. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1604 communicates through the cellular RF transceiver 1622 with the UE 104 and/or base station 102/180. The cellular baseband processor 1604 may include a computer-readable medium/ memory. The computer-readable medium/memory may be non-transitory. The cellular baseband processor 1604 is responsible for general processing, including the execution of software stored on the computer-readable medium/ memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The baseband processor 1604 may be a component of the second wireless communication device 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire wireless device (e.g., see the second wireless communication device 350 of FIG. 3) and include the additional modules of the apparatus 1602.

The communication manager 1632 includes a message component 1640 that is configured to receive a message based on a GNLP, for example, as described in connection with 1202 of FIGS. 12 and/or 1302 of FIG. 13. The example message component 1640 may also be configured to receive, from a transmitting UE, a message via sidelink, the message based on a GNLP and including a GNLP header, for example, as described in connection 1402 of FIGS. 14 and/or 1502 of FIG. 15.

The communication manager 1632 also includes a header component 1642 that is configured to populate the GNLP header to indicate that the message is associated with an identifier-based transport type, for example, as described in connection with 1204 of FIGS. 12 and/or 1304 of FIG. 13. The example header component 1642 may also be configured to uses the GNLP header to determine that the message is associated with a single-hop transport type, the single-hop transport type including a unicast message, a groupcast message, or a broadcast message, for example, as described in connection with 1404 of FIGS. 14 and/or 1504 of FIG. 15.

The example transmission component 1634 of the communication manager 1632 may be configured to transmit the message via sidelink to a receiving UE, for example, as described in connection with 1206 of FIGS. 12 and/or 1326 of FIG. 13.

The communication manager 1632 also includes a unicast component 1644 that is configured to encode a header type field of the GNLP header with a first value associated with a topologically-scoped unicast message, for example, as described in connection with 1306 of FIG. 13. The example unicast component 1644 may also be configured to encode a header sub-type field of the GNLP header with a second value based on a hop count associated with the unicast message, for example, as described in connection with 1308 of FIG. 13. The example unicast component 1644 may also be configured to populate an access layer header of the message to facilitate an address-based unicast message, for example, as described in connection with 1310 of FIG. 13.

The example unicast component 1644 may also be configured to use an access layer header of the message to facilitate an address-based unicast message, for example, as described in connection with 1506 of FIG. 15.

The communication manager 1632 also includes a groupcast component 1646 that is configured to encode a header sub-type field of the GNLP header with a second value based on a hop count associated with the groupcast message, for example, as described in connection with 1312 of FIG. 13. The example groupcast component 1646 may also be configured to encode a header sub-type field of the GNLP header with a second value based on a hop count associated with the groupcast message, for example, as described in connection with 1314 of FIG. 13. The example groupcast component 1646 may also be configured to populate an access layer header of the message to facilitate an identifier-based groupcast message, for example, as described in connection with 1316 of FIG. 13. The example groupcast component 1646 may also be configured to use an access layer header of the message to facilitate an identifier-based groupcast message, for example, as described in connection 1508 of FIG. 15.

The communication manager 1632 also includes a broadcast component 1648 that is configured to encode a header type field of the GNLP header with a first value associated with a topologically-scoped broadcast message, for example, as described in connection with 1318 of FIG. 13. The example broadcast component 1648 may also be configured to encode a header sub-type field of the GNLP header with a second value based on a hop count associated with the broadcast message, for example, as described in connection with 1320 of FIG. 13.

The communication manager 1632 also includes a single-hop component 1650 that is configured to encode a header type field of the GNLP header with a first value associated with a single-hop transmission message, for example, as described in connection with 1322 of FIG. 13. The example single-hop component 1650 may also be configured to encode a header sub-type field of the GNLP header with a second value based on a cast-type associated with the single-hop transmission message, for example, as described in connection with 1324 of FIG. 13.

The apparatus may include additional components that perform each of the blocks of the algorithm in the flowcharts of FIGS. 12, 13, 14, and/or 15. As such, each block in the flowcharts of FIGS. 12, 13, 14, and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the cellular baseband processor 1604, includes means for receiving a message based on a GNLP, the message including a GNLP header. The example apparatus 1602 also includes means for populating the GNLP header to indicate that the message is associated with a single-hop transport type, the single-hop transport type including a unicast message, a groupcast message, or a broadcast message. The example apparatus 1602 also includes means for transmitting the message via sidelink to a receiving UE.

In another configuration, the example apparatus 1602 also includes means for encoding a header type field of the GNLP header with a first value associated with a topologically-scoped unicast message. The example apparatus 1602 also includes means for encoding a header sub-type field of the GNLP header with a second value based on a hop count associated with the unicast message.

In another configuration, the example apparatus 1602 also includes means for populating an access layer header of the message to facilitate an address-based unicast message.

In another configuration, the example apparatus 1602 also includes means for encoding a header type field of the GNLP header with a first value associated with a topologically-scoped groupcast message. The example apparatus 1602 also includes means for encoding a header sub-type field of the GNLP header with a second value based on a hop count associated with the groupcast message.

In another configuration, the example apparatus 1602 also includes means for populating an access layer header of the message to facilitate an identifier-based groupcast message.

In another configuration, the example apparatus 1602 also includes means for encoding a header type field of the GNLP header with a first value associated with a topologically-scoped broadcast message. The example apparatus 1602 also includes means for encoding a header sub-type field of the GNLP header with a second value based on a hop count associated with the broadcast message.

In another configuration, the example apparatus 1602 also includes means for encoding a header type field of the GNLP header with a first value associated with the single-hop transmission message.

In another configuration, the example apparatus 1602 also includes means for encoding a header sub-type field of the GNLP header with a second value based on a cast-type associated with the single-hop transmission message.

In another configuration, the apparatus 1602, and in particular the cellular baseband processor 1604, includes means for receiving, from a transmitting UE, a message via sidelink, the message based on a GNLP and including a GNLP header. The example apparatus 1602 also includes means for using the GNLP header to determine that the message is associated with a single-hop transport type, the single-hop transport type including a unicast message, a groupcast message, or a broadcast message.

In another configuration, the example apparatus 1602 also includes means for using an access layer header of the message to facilitate an address-based unicast message.

In another configuration, the example apparatus 1602 also includes means for using an access layer header of the message to facilitate an identifier-based groupcast message.

The means may be one or more of the components of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a transmitting UE including at least one processor coupled to a memory and configured to receive a message based on a GNLP, the message including a GNLP header; populate the GNLP header to indicate that the message is associated with a single-hop transport type, the single-hop transport type including a unicast message, a groupcast message, or a broadcast message; and transmit the message via sidelink to a receiving UE.

Aspect 2 is the apparatus of aspect 1, further including that the message corresponds to the unicast message, and wherein to populate the GNLP header, the memory and the at least one processor are further configured to: encode a header type field of the GNLP header with a first value associated with a topologically-scoped unicast message; and encode a header sub-type field of the GNLP header with a second value based on a hop count associated with the unicast message.

Aspect 3 is the apparatus of any of aspects 1 and 2, further including that the memory and the at least one processor are further configured to: populate an access layer header of the message to facilitate an address-based unicast message.

Aspect 4 is the apparatus of any of aspects 1 to 3, further including that the GNLP header includes source position information associated with the transmitting UE, and the GNLP header excludes destination position information associated with the receiving UE.

Aspect 5 is the apparatus of any of aspects 1 to 3, further including that the GNLP header includes a network address associated with the transmitting UE, and the GNLP header excludes geographical information associated with the transmitting UE.

Aspect 6 is the apparatus of aspect 1, further including that the message corresponds to the groupcast message, and wherein to populate the GNLP header, the memory and the at least one processor are further configured to: encode a header type field of the GNLP header with a first value associated with a topologically-scoped groupcast message; and encode a header sub-type field of the GNLP header with a second value based on a hop count associated with the groupcast message.

Aspect 7 is the apparatus of any of aspects 1 and 6, further including that the memory and the at least one processor are further configured to: populate an access layer header of the message to facilitate an identifier-based groupcast message.

Aspect 8 is the apparatus of any of aspects 1, 6, and 7, further including that the GNLP header includes source position information associated with the transmitting UE, and the GNLP header excludes destination position information associated with the receiving UE.

Aspect 9 is the apparatus of any of aspects 1, 6, and 7, further including that the GNLP header includes a network address associated with the transmitting UE, and the GNLP header excludes geographical information associated with the transmitting UE.

Aspect 10 is the apparatus of aspect 1, further including that the message corresponds to the broadcast message, and wherein to populate the GNLP header, the memory and the at least one processor are further configured to: encode a header type field of the GNLP header with a first value associated with a topologically-scoped broadcast message; and encode a header sub-type field of the GNLP header with a second value based on a hop count associated with the broadcast message.

Aspect 11 is the apparatus of any of aspects 1 and 10, further including that the GNLP header includes a network address associated with the transmitting UE, and the GNLP header excludes geographical information associated with the transmitting UE.

Aspect 12 is the apparatus of aspect 1, further including that the message corresponds to a single-hop transmission message, and wherein to populate the GNLP header, the memory and the at least one processor are further configured to: encode a header type field of the GNLP header with a first value associated with the single-hop transmission message.

Aspect 13 is the apparatus of any of aspects 1 and 12, further including that the memory and the at least one processor are further configured to: encode a header sub-type field of the GNLP header with a second value based on a cast-type associated with the single-hop transmission message.

Aspect 14 is the apparatus of any of aspects 1, 12, and 13, further including that the GNLP header includes source position information associated with the transmitting UE, and the GNLP header excludes destination position information associated with the receiving UE.

Aspect 15 is the apparatus of any of aspects 1, 12, and 13, further including that the GNLP header includes a network address associated with the transmitting UE, and the GNLP header excludes geographical information associated with the transmitting UE.

Aspect 16 is the apparatus of any of aspects 1 to 15, further including that the GNLP header includes source position information associated with the transmitting UE, and the GNLP header excludes destination position information associated with the receiving UE.

Aspect 17 is the apparatus of any of aspects 1 to 15, further including that the GNLP header includes a network address associated with the transmitting UE, and the GNLP header excludes geographical information associated with the transmitting UE.

Aspect 18 is the apparatus of any of aspects 1 to 15, further including a transceiver coupled to the at least one processor.

Aspect 19 is a method of wireless communication for implementing any of aspects 1 to 18.

Aspect 20 is an apparatus for wireless communication including means for implementing any of aspects 1 to 18.

Aspect 21 is a non-transitory computer-readable storage medium storing computer executable code, where the code, when executed, causes a processor to implement any of aspects 1 to 18.

Aspect 22 is an apparatus for wireless communication at a receiving UE including at least one processor coupled to a memory and configured to receive, from a transmitting UE, a message via sidelink, the message based on a GNLP and including a GNLP header; and use the GNLP header to determine that the message is associated with a single-hop transport type, the single-hop transport type including a unicast message, a groupcast message, or a broadcast message.

Aspect 23 is the apparatus of aspect 22, further including that the message corresponds to the unicast message, and the GNLP header includes: a header type field of the GNLP header including a first value associated with a topologically-scoped unicast message, and a header sub-type field of the GNLP header including a second value based on a hop count associated with the unicast message.

Aspect 24 is the apparatus of any of aspects 22 and 23, further including that the memory and the at least one processor are further configured to: use an access layer header of the message to facilitate an address-based unicast message.

Aspect 25 is the apparatus of any of aspects 22 to 24, further including that the GNLP header includes source position information associated with the transmitting UE, and the GNLP header excludes destination position information associated with the receiving UE.

Aspect 26 is the apparatus of any of aspects 22 to 24, further including that the GNLP header includes a network address associated with the transmitting UE, and the GNLP header excludes geographical information associated with the transmitting UE.

Aspect 27 is the apparatus of aspect 22, further including that the message corresponds to the groupcast message, and the GNLP header includes: a header type field of the GNLP header including a first value associated with a topologically-scoped groupcast message, and a header sub-type field of the GNLP header including a second value based on a hop count associated with the groupcast message.

Aspect 28 is the apparatus of any of aspects 22 and 27, further including that the memory and the at least one processor are further configured to: use an access layer header of the message to facilitate an identifier-based groupcast message.

Aspect 29 is the apparatus of any of aspects 22, 27, and 28, further including that the GNLP header includes source position information associated with the transmitting UE, and the GNLP header excludes destination position information associated with the receiving UE.

Aspect 30 is the apparatus of any of aspects 22, 27, and 28, further including that the GNLP header includes a network address associated with the transmitting UE, and the GNLP header excludes geographical information associated with the transmitting UE.

Aspect 31 is the apparatus of aspect 22, further including that the message corresponds to the broadcast message, and the GNLP header includes: a header type field of the GNLP header including a first value associated with a topologically-scoped broadcast message; and a header sub-type field of the GNLP header including a second value based on a hop count associated with the broadcast message.

Aspect 32 is the apparatus of any of aspects 22 and 31, further including that the GNLP header includes a network address associated with the transmitting UE, and the GNLP header excludes geographical information associated with the transmitting UE.

Aspect 33 is the apparatus of aspect 22, further including that the message corresponds to a single-hop transmission message, and the GNLP header includes: a header type field of the GNLP header including a first value associated with the single-hop transmission message.

Aspect 34 is the apparatus of any of aspects 22 and 33, further including that the GNLP header further includes a header sub-type field of the GNLP header including a second value based on a cast-type associated with the single-hop transmission message.

Aspect 35 is the apparatus of any of aspects 22, 33, and 34, further including that the GNLP header includes source position information associated with the transmitting UE, and the GNLP header excludes destination position information associated with the receiving UE.

Aspect 36 is the apparatus of any of aspects 22, 33, and 34, further including that the GNLP header includes a network address associated with the transmitting UE, and the GNLP header excludes geographical information associated with the transmitting UE.

Aspect 37 is the apparatus of any of aspects 22 to 36, further including that the GNLP header includes source position information associated with the transmitting UE, and the GNLP header excludes destination position information associated with the receiving UE.

Aspect 38 is the apparatus of any of aspects 22 to 36, further including that the GNLP header includes a network address associated with the transmitting UE, and the GNLP header excludes geographical information associated with the transmitting UE.

Aspect 39 is the apparatus of any of aspects 22 to 38, further including a transceiver coupled to the at least one processor.

Aspect 40 is a method of wireless communication for implementing any of aspects 22 to 39.

Aspect 41 is an apparatus for wireless communication including means for implementing any of aspects 22 to 39.

Aspect 42 is a non-transitory computer-readable storage medium storing computer executable code, where the code, when executed, causes a processor to implement any of aspects 22 to 39.

What is claimed is:

1. An apparatus for wireless communication at a transmitting user equipment (UE), comprising:
   memory; and
   at least one processor coupled to the memory, the at least one processor configured to:
      receive a message based on a geographical network layer protocol (GNLP), the message including a GNLP header;
      populate the GNLP header to indicate that the message is associated with a transport type including a unicast message or a groupcast message, wherein to populate the GNLP header, the at least one processor is configured to:
         encode a header type field of the GNLP header with a first value associated with one of a topologically scoped unicast message or a topologically scoped groupcast message; and
      transmit the message via sidelink to a receiving UE.

2. The apparatus of claim 1, wherein the message corresponds to the unicast message, and the at least one processor is configured to encode the header type field of the GNLP header with the first value associated with the topologically scoped unicast message, and is further configured to:
   encode a header sub-type field of the GNLP header with a second value based on a hop count associated with the unicast message.

3. The apparatus of claim 1, wherein the message corresponds to the groupcast message, and the at least one processor is configured to encode the header type field of the GNLP header with the first value associated with the topologically scoped groupcast message, and is further configured to:
   encode a header sub-type field of the GNLP header with a second value based on a hop count associated with the groupcast message.

4. The apparatus of claim 1, wherein the message corresponds to a single-hop transmission message.

5. The apparatus of claim 1, wherein
   the GNLP header includes source position information associated with the transmitting UE, and
   the GNLP header excludes destination position information associated with the receiving UE.

6. The apparatus of claim 1, wherein
   the GNLP header includes a network address associated with the transmitting UE, and
   the GNLP header excludes geographical information associated with the transmitting UE.

7. The apparatus of claim 1, further comprising a transceiver coupled to the at least one processor.

8. The apparatus of claim 1, wherein the at least one processor is, individually or in combination, configured to receive the message based on the GNLP, populate the GNLP header to indicate that the message is associated with the transport type, and transmit the message via the sidelink to the receiving UE.

9. An apparatus for wireless communication at a transmitting user equipment (UE), comprising:
   memory; and
   at least one processor coupled to the memory, the at least one processor configured to:
      receive a message based on a geographical network layer protocol (GNLP), the message including a GNLP header;
      populate the GNLP header to indicate that the message is associated with a single-hop transport type, the single-hop transport type including a unicast message, a groupcast message, or a broadcast message, wherein to populate the GNLP header, the at least one processor is configured to:
         encode a header type field of the GNLP header with a first value associated with the message; and
         encode a header sub-type field of the GNLP header with a second value based on a cast-type associated with a single-hop transmission message; and
      transmit the message via sidelink to a receiving UE.

10. The apparatus of claim 9, wherein the message corresponds to the broadcast message.

11. The apparatus of claim 9, wherein
    the GNLP header includes source position information associated with the transmitting UE, and
    the GNLP header excludes destination position information associated with the receiving UE.

12. The apparatus of claim 9, wherein
    the GNLP header includes a network address associated with the transmitting UE, and
    the GNLP header excludes geographical information associated with the transmitting UE.

13. A method of wireless communication at a transmitting user equipment (UE), comprising:
receiving a message based on a geographical network layer protocol (GNLP), the message including a GNLP header;
populating the GNLP header to indicate that the message is associated with a transport type including a unicast message or a groupcast message, wherein populating the GNLP header includes:
setting a header type field of the GNLP header to a first value associated with one of a topologically scoped unicast message or a topologically scoped groupcast message; and
transmitting the message via sidelink to a receiving UE.

14. The method of claim 13, wherein the message corresponds to the unicast message, and the method includes encoding the header type field of the GNLP header with the first value associated with the topologically scoped unicast message and encoding a header sub-type field of the GNLP header with a second value based on a hop count associated with the unicast message.

15. The method of claim 13, wherein the message corresponds to the groupcast message, and the method includes encoding the header type field of the GNLP header with the first value associated with the topologically scoped groupcast message and encoding a header sub-type field of the GNLP header with a second value based on a hop count associated with the groupcast message.

16. The method of claim 13, wherein the message corresponds to a single-hop transmission message.

17. The method of claim 13, wherein
the GNLP header includes source position information associated with the transmitting UE, and
the GNLP header excludes destination position information associated with the receiving UE.

18. The method of claim 13, wherein
the GNLP header includes a network address associated with the transmitting UE, and
the GNLP header excludes geographical information associated with the transmitting UE.

19. A method of wireless communication at a transmitting user equipment (UE), comprising:
receiving a message based on a geographical network layer protocol (GNLP), the message including a GNLP header;
populating the GNLP header to indicate that the message is associated with a single-hop transport type, the single-hop transport type including a unicast message, a groupcast message, or a broadcast message, wherein populating the GNLP header includes:
setting a header type field of the GNLP header to a first value associated with the message; and
setting a header sub-type field of the GNLP header to a second value based on a cast-type associated with a single-hop transmission message; and
transmitting the message via sidelink to a receiving UE.

20. An apparatus for wireless communication at a receiving user equipment (UE), comprising:
memory; and
at least one processor coupled to the memory, the at least one processor configured to:
receive, from a transmitting UE, a message via sidelink, the message based on a geographical network layer protocol (GNLP) and including a GNLP header, the GNLP header including a header type field including a first value associated with one of a topologically scoped unicast message or a topologically scoped groupcast message; and
use the GNLP header to determine that the message is associated with a transport type including a unicast message or a groupcast message.

21. The apparatus of claim 20, wherein the message corresponds to the unicast message, wherein the first value is associated with the topologically scoped unicast message, and wherein a header sub-type field of the GNLP header with a second value is based on a hop count associated with the unicast message.

22. The apparatus of claim 20, wherein the message corresponds to the groupcast message, wherein the first value is associated with the topologically scoped groupcast message, and wherein a header sub-type field of the GNLP header with a second value is based on a hop count associated with the groupcast message.

23. The apparatus of claim 20, wherein
the GNLP header includes source position information associated with the transmitting UE, and
the GNLP header excludes destination position information associated with the receiving UE.

24. The apparatus of claim 20, wherein
the GNLP header includes a network address associated with the transmitting UE, and
the GNLP header excludes geographical information associated with the transmitting UE.

25. The apparatus of claim 20, further comprising a transceiver coupled to the at least one processor.

26. The apparatus of claim 20, wherein the at least one processor is, individually or in combination, configured to receive the message via the sidelink, and use the GNLP header to determine that the message is associated with the transport type.

27. A method of wireless communication at a receiving user equipment (UE), comprising:
receiving, from a transmitting UE, a message via sidelink, the message based on a geographical network layer protocol (GNLP) and including a GNLP header, the GNLP header including a header type field including a first value associated with one of a topologically scoped unicast message or a topologically scoped groupcast message; and
using the GNLP header to determine that the message is associated with a transport type including a unicast message or a groupcast message.

28. The method of claim 27, wherein the message corresponds to the unicast message, wherein the first value is associated with the topologically scoped unicast message, and wherein a header sub-type field of the GNLP header with a second value is based on a hop count associated with the unicast message.

29. The method of claim 27, wherein the message corresponds to the groupcast message, wherein the first value is associated with the topologically scoped groupcast message, and wherein a header sub-type field of the GNLP header with a second value is based on a hop count associated with the unicast message.

30. The method of claim 27, wherein
the GNLP header includes source position information associated with the transmitting UE, and
the GNLP header excludes destination position information associated with the receiving UE.

31. The method of claim 27, wherein
the GNLP header includes a network address associated with the transmitting UE, and the GNLP header excludes geographical information associated with the transmitting UE.

32. An apparatus for wireless communication at a receiving user equipment (UE), comprising:
- memory; and
- at least one processor coupled to the memory, the at least one processor configured to:
  - receive, from a transmitting UE, a message via sidelink, the message based on a geographical network layer protocol (GNLP) and including a GNLP header, the GNLP header including a header type field including a first value associated with a single-hop transmission message and a header sub-type field of the GNLP header with a second value based on a cast-type associated with the single-hop transmission message; and
  - use the GNLP header to determine that the message is associated with a single-hop transport type, the single-hop transport type including a unicast message, a groupcast message, or a broadcast message.

33. The apparatus of claim 32, wherein the message corresponds to the broadcast message.

34. A method of wireless communication at a receiving user equipment (UE), comprising:
- receiving, from a transmitting UE, a message via sidelink, the message based on a geographical network layer protocol (GNLP) and including a GNLP header, the GNLP header including a header type field including a first value associated with a single-hop transmission message and a header sub-type field of the GNLP header with a second value based on a cast-type associated with the single-hop transmission message; and
- use the GNLP header to determine that the message is associated with a single-hop transport type, the single-hop transport type including a unicast message, a groupcast message, or a broadcast message.

* * * * *